United States Patent
Yoo et al.

(10) Patent No.: US 10,534,475 B2
(45) Date of Patent: Jan. 14, 2020

(54) MOBILE TERMINAL AND CONTROL METHOD THEREOF

(71) Applicant: LG ELECTRONICS INC., Seoul (KR)

(72) Inventors: Jihyung Yoo, Seoul (KR); Minjae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 15/456,438

(22) Filed: Mar. 10, 2017

(65) Prior Publication Data
US 2017/0336913 A1 Nov. 23, 2017

(30) Foreign Application Priority Data

May 20, 2016 (KR) .................. 10-2016-0062321

(51) Int. Cl.
*G06F 3/041* (2006.01)
*G06F 3/0488* (2013.01)
*G06F 1/16* (2006.01)
*H04M 1/725* (2006.01)

(52) U.S. Cl.
CPC .. *G06F 3/0418* (2013.01); *G06F 2203/04101* (2013.01); *H04M 1/72583* (2013.01); *H04M 2250/22* (2013.01)

(58) Field of Classification Search
CPC .............. G06F 1/1643; G06F 1/1647; G06F 2203/04101; G06F 3/0418; G06F 3/0488; G06F 1/1692; G06F 3/0414; H04M 1/72583; H04M 2250/22
See application file for complete search history.

(56) References Cited

U.S. PATENT DOCUMENTS

| 2011/0128241 | A1* | 6/2011 | Kang | G06F 1/1643 345/173 |
| 2013/0044072 | A1* | 2/2013 | Kobayashi | H04M 1/0237 345/173 |
| 2014/0082489 | A1* | 3/2014 | Park | G06F 3/0488 715/702 |
| 2014/0132481 | A1 | 5/2014 | Bell et al. | |
| 2014/0282174 | A1* | 9/2014 | Dempski | G06F 3/0482 715/771 |

(Continued)

FOREIGN PATENT DOCUMENTS

KR 20150107476 9/2015

OTHER PUBLICATIONS

PCT International Application No. PCT/KR2017/000945, Notification of Transmittal of the International Search Report and the Written Opinion of the International Searching Authority, or Declaration dated May 19, 2017, 10 pages.

*Primary Examiner* — Patrick N Edouard
*Assistant Examiner* — Douglas M Wilson
(74) *Attorney, Agent, or Firm* — Lee, Hong, Degerman, Kang & Waimey

(57) ABSTRACT

A mobile terminal includes a terminal body having a front surface, a side surface, and a rear surface, a touch screen disposed on the front surface and extending from the front surface to the side surface and the rear surface, and a controller performing controlling differently in relation to a graphic object output on a first region of the touch screen disposed on the front surface according to different types of touches applied to the graphic object.

11 Claims, 27 Drawing Sheets

(56) References Cited

U.S. PATENT DOCUMENTS

| | | | |
|---|---|---|---|
| 2015/0015512 A1* | 1/2015 | Kwak | G06F 3/0412 |
| | | | 345/173 |
| 2015/0091835 A1* | 4/2015 | Jeong | G06F 3/04847 |
| | | | 345/173 |
| 2015/0212784 A1 | 7/2015 | Myers | |
| 2015/0339055 A1 | 11/2015 | Cho | |
| 2016/0062515 A1 | 3/2016 | Bae et al. | |
| 2016/0316147 A1* | 10/2016 | Bernstein | H04N 5/23293 |
| 2017/0115793 A1* | 4/2017 | Namgoong | G06F 1/1647 |
| 2017/0115944 A1* | 4/2017 | Oh | G06F 3/0346 |
| 2017/0329472 A1* | 11/2017 | Kim | G06F 3/0481 |
| 2017/0336946 A1* | 11/2017 | Jong | G06F 3/0483 |
| 2018/0131876 A1* | 5/2018 | Bernstein | H04N 5/23293 |

\* cited by examiner (a)  (b)  (c)

(a)                    (b)

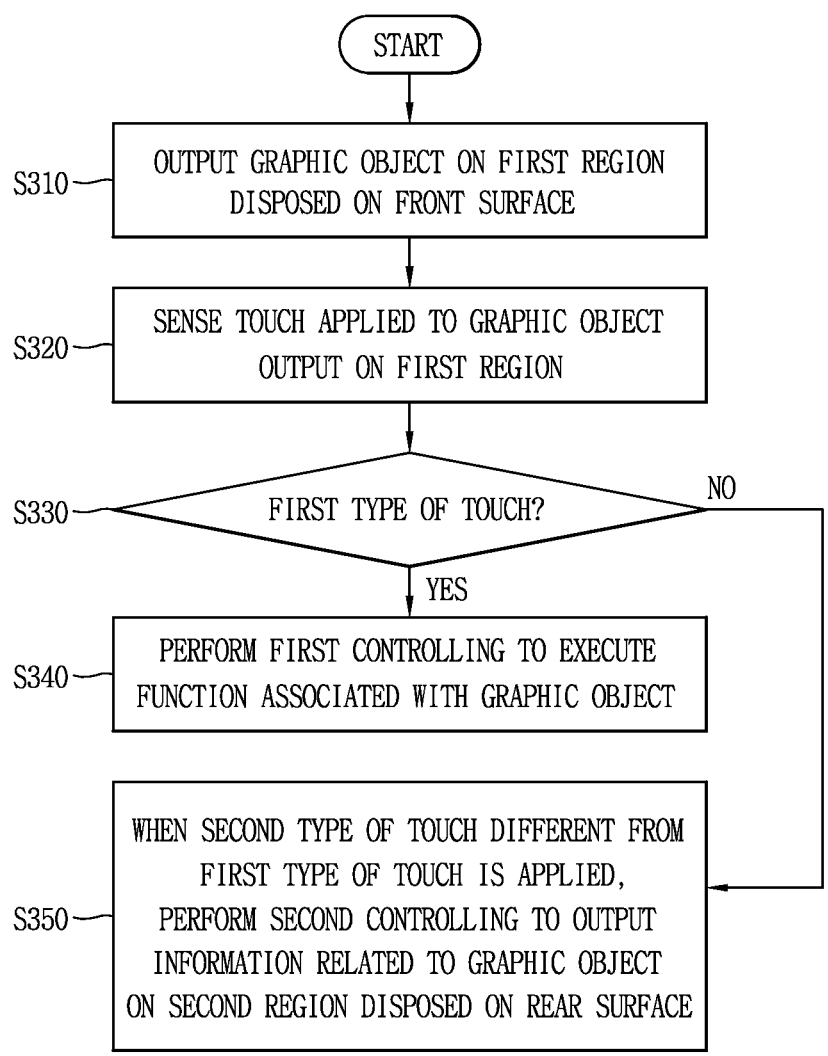

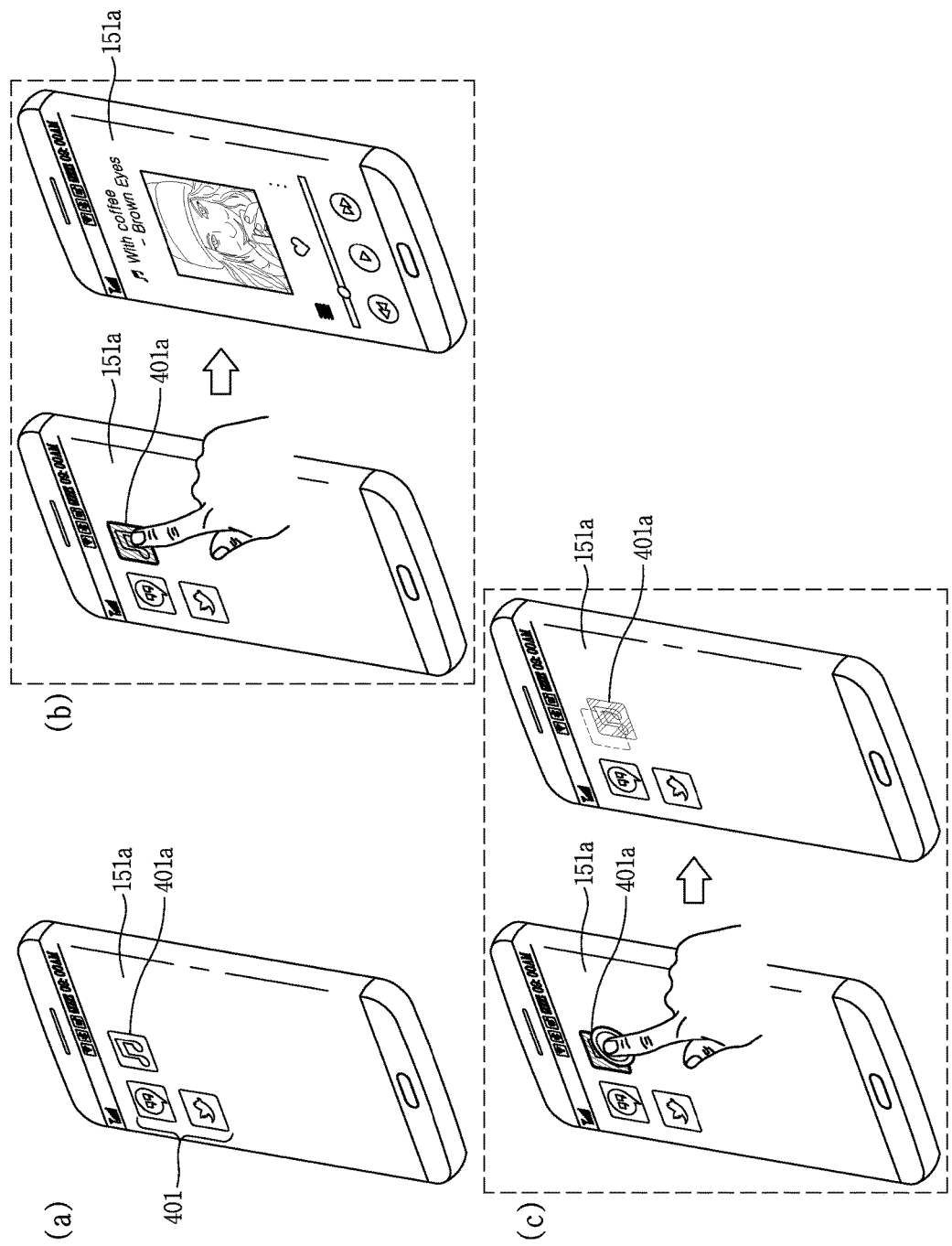

FIG. 4B
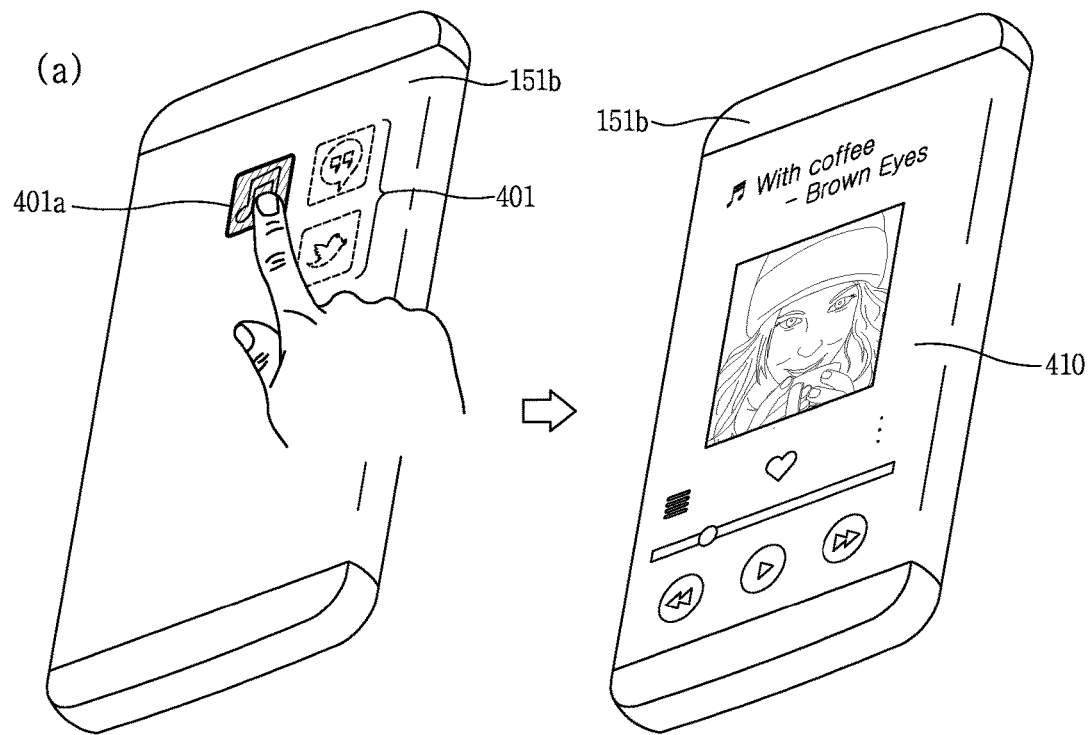
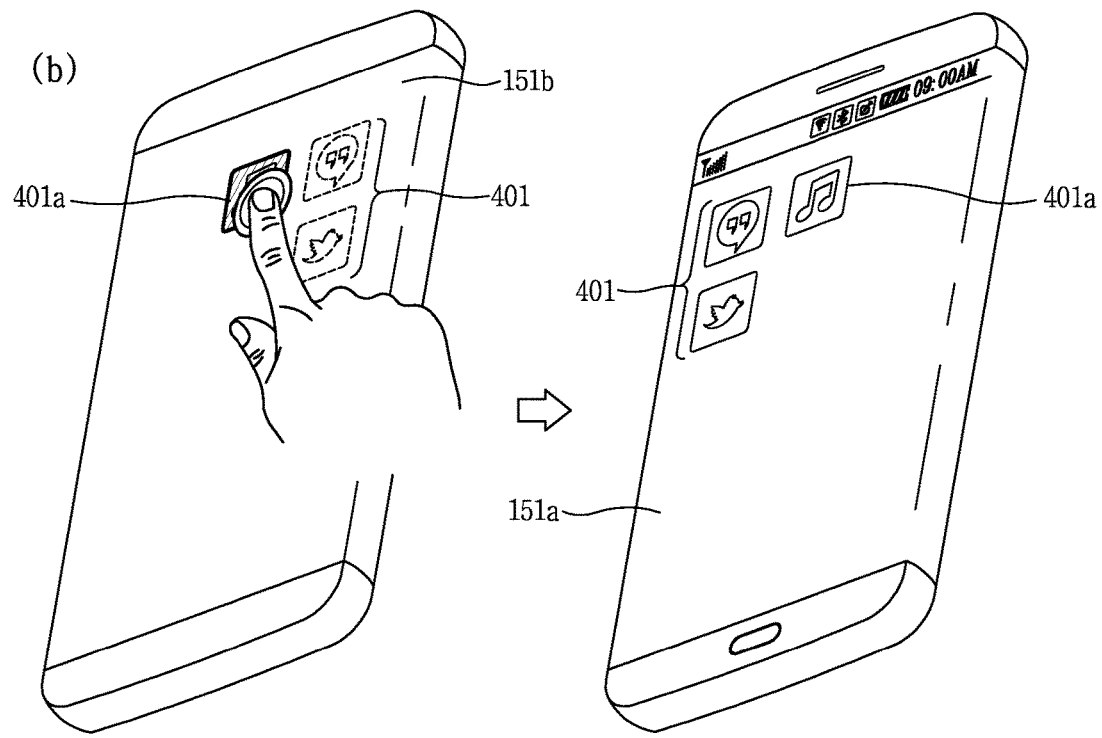

FIG. 5B
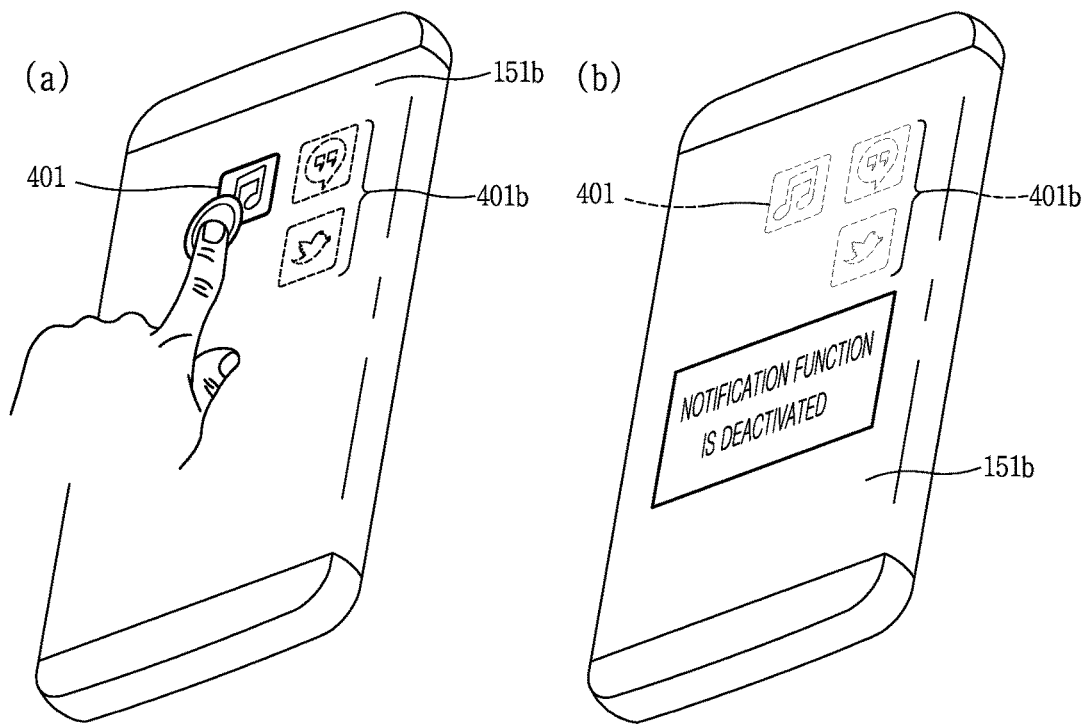
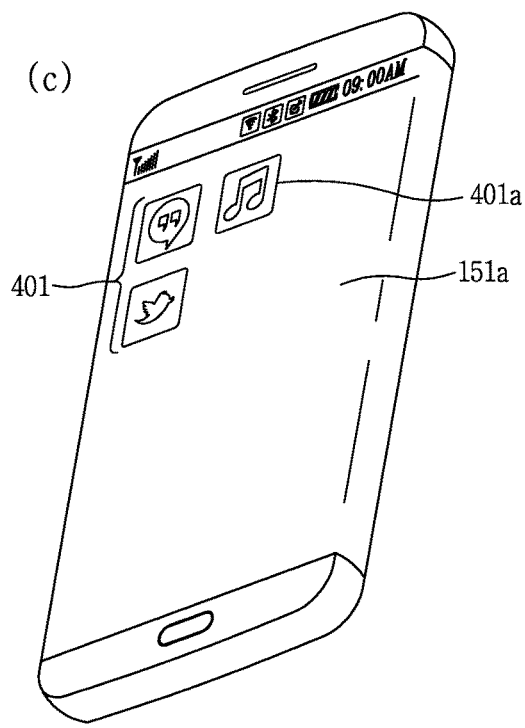

FIG. 6A
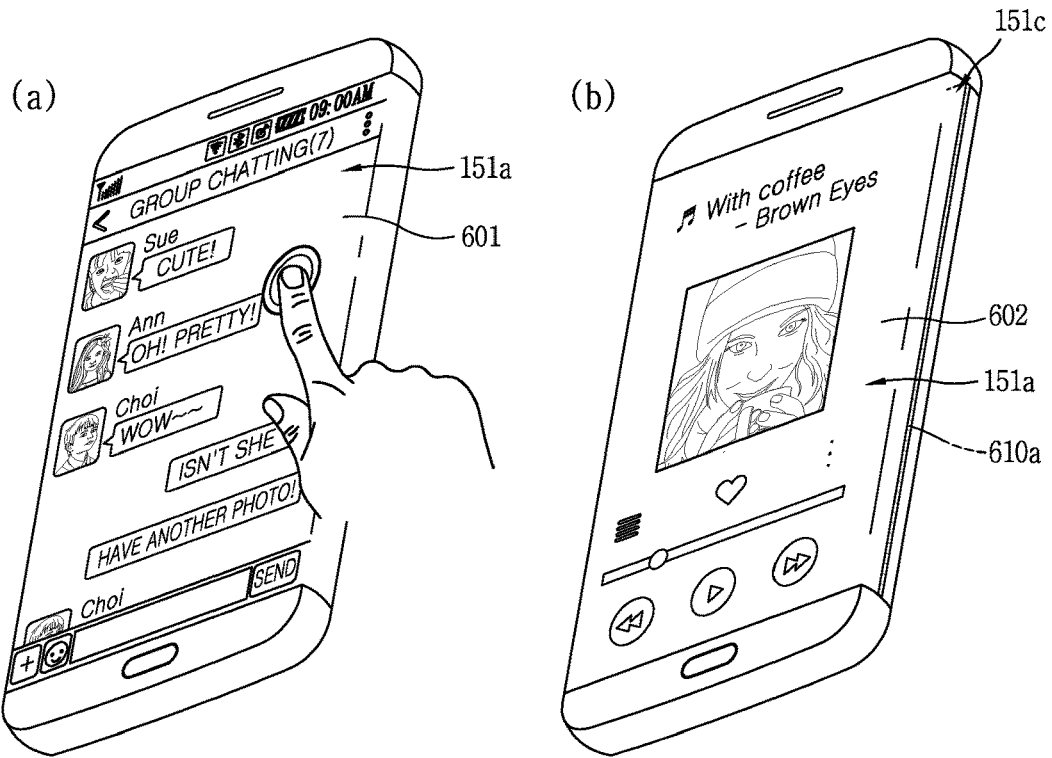
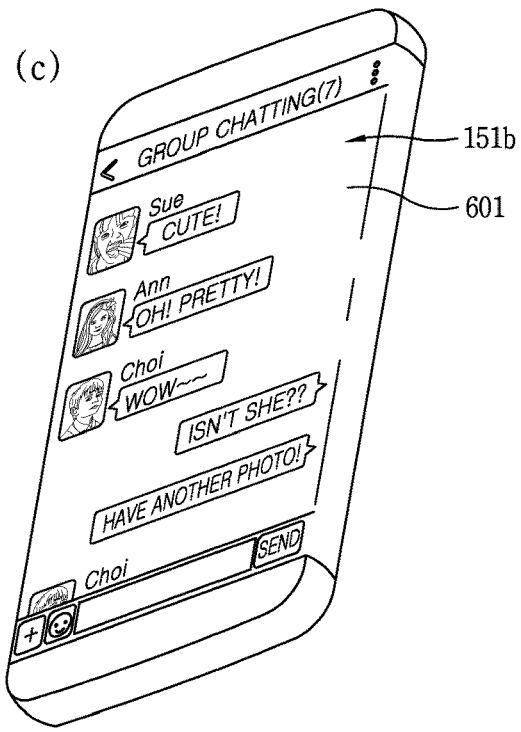

FIG. 7A
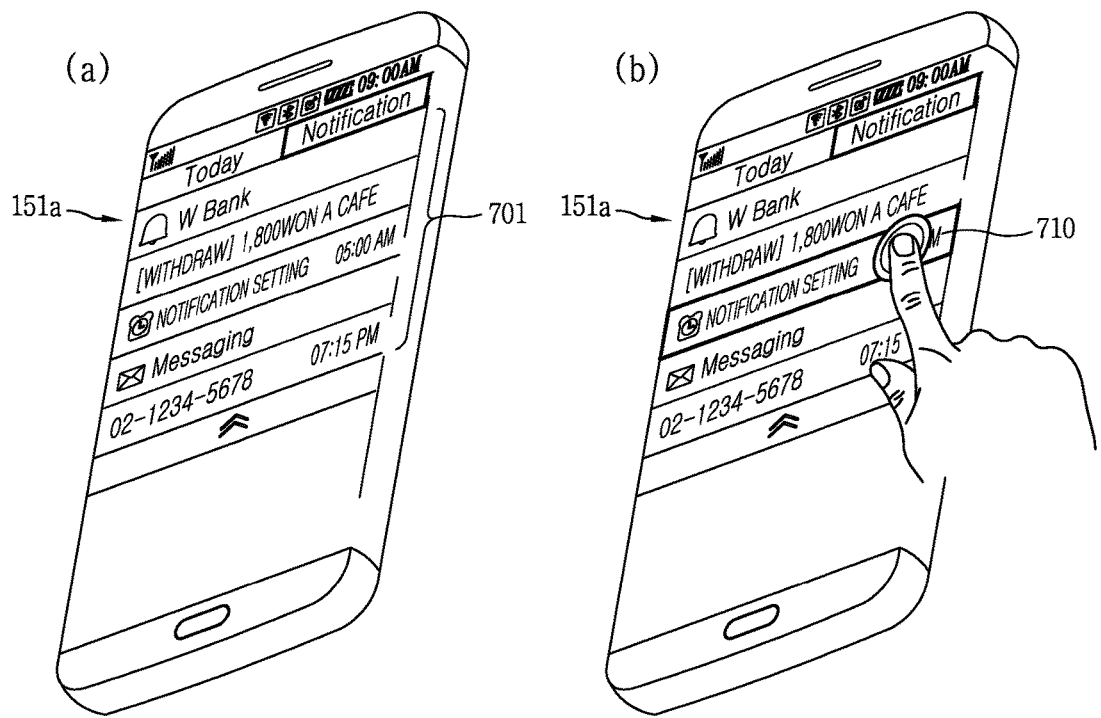
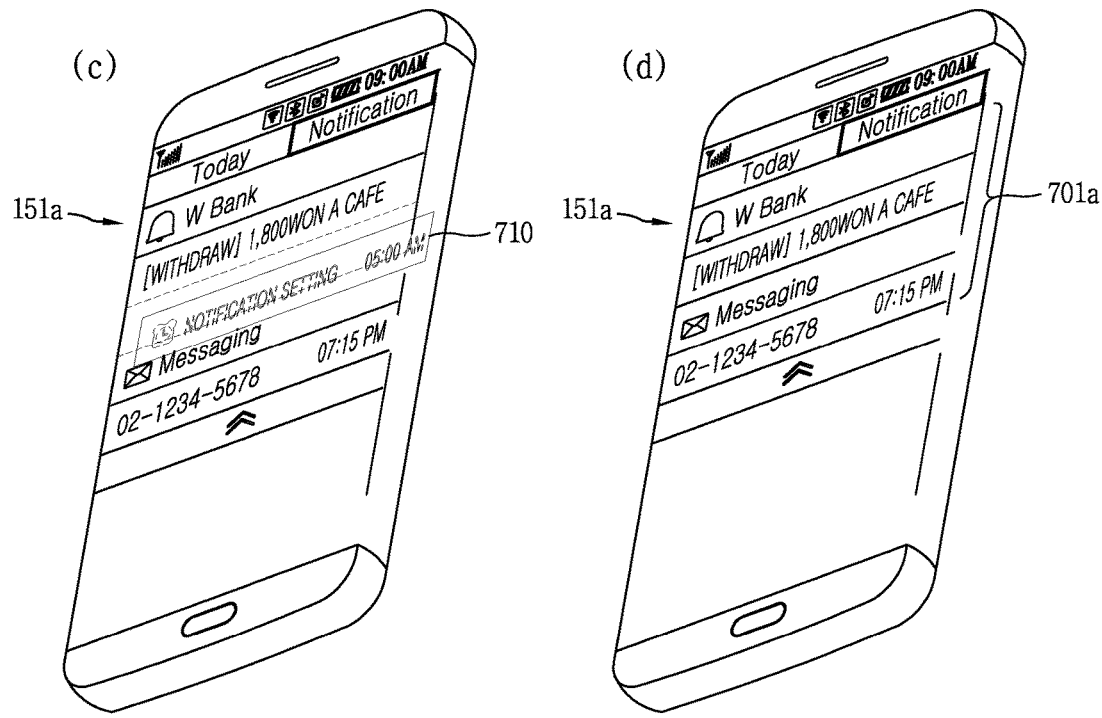

FIG. 9A
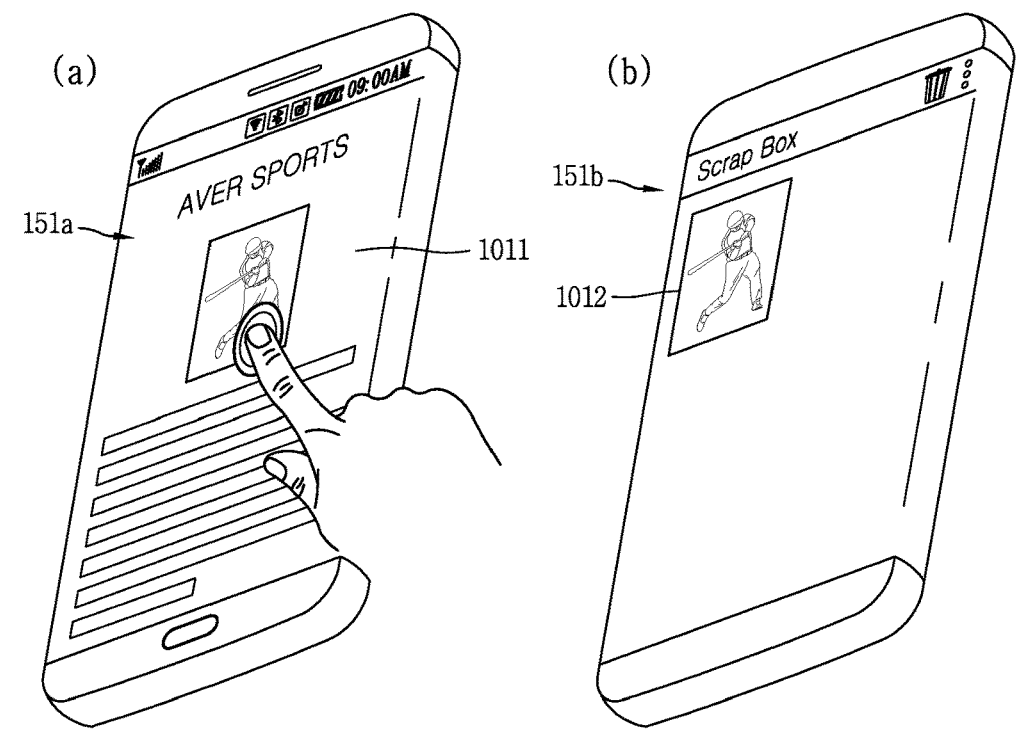
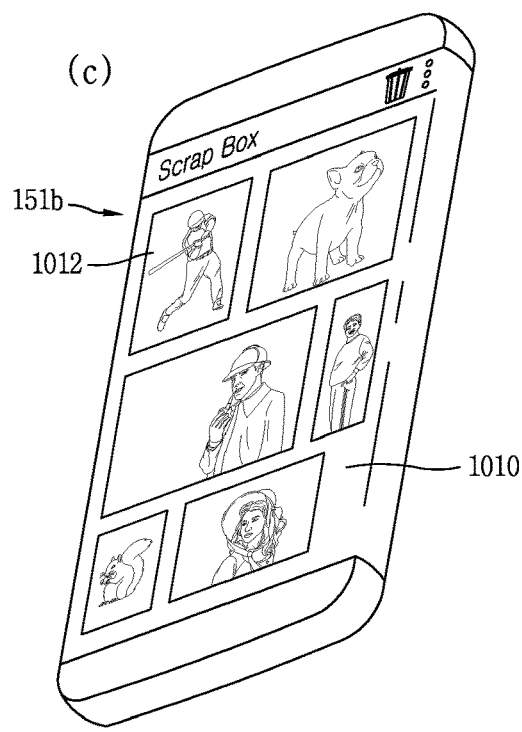

FIG. 9B
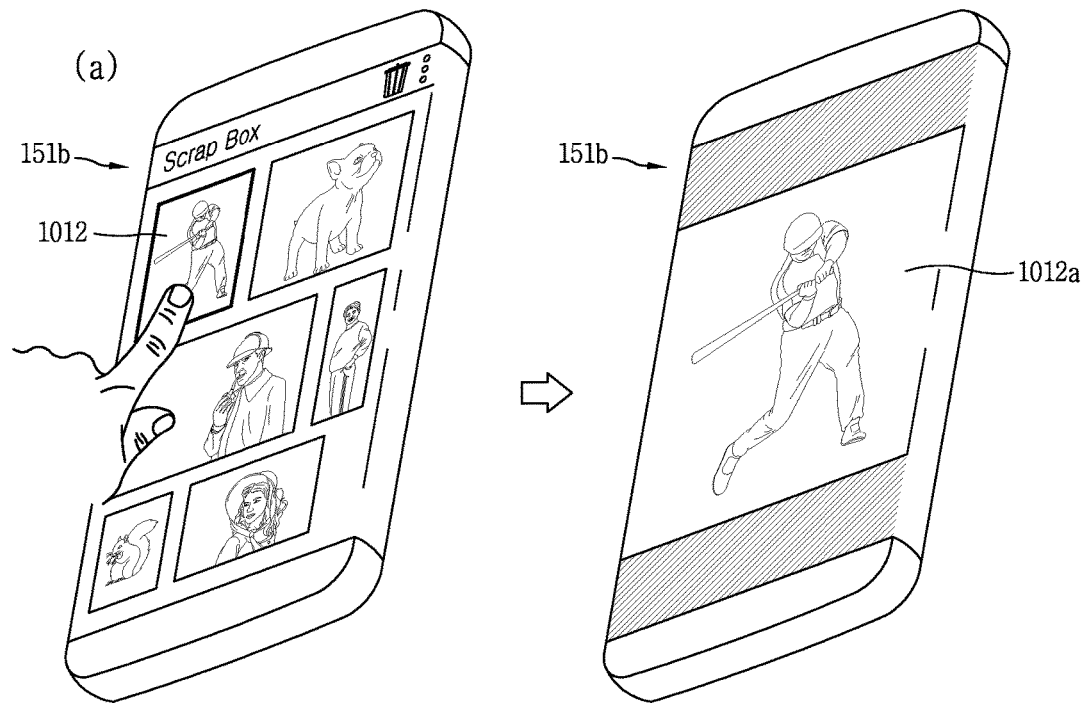
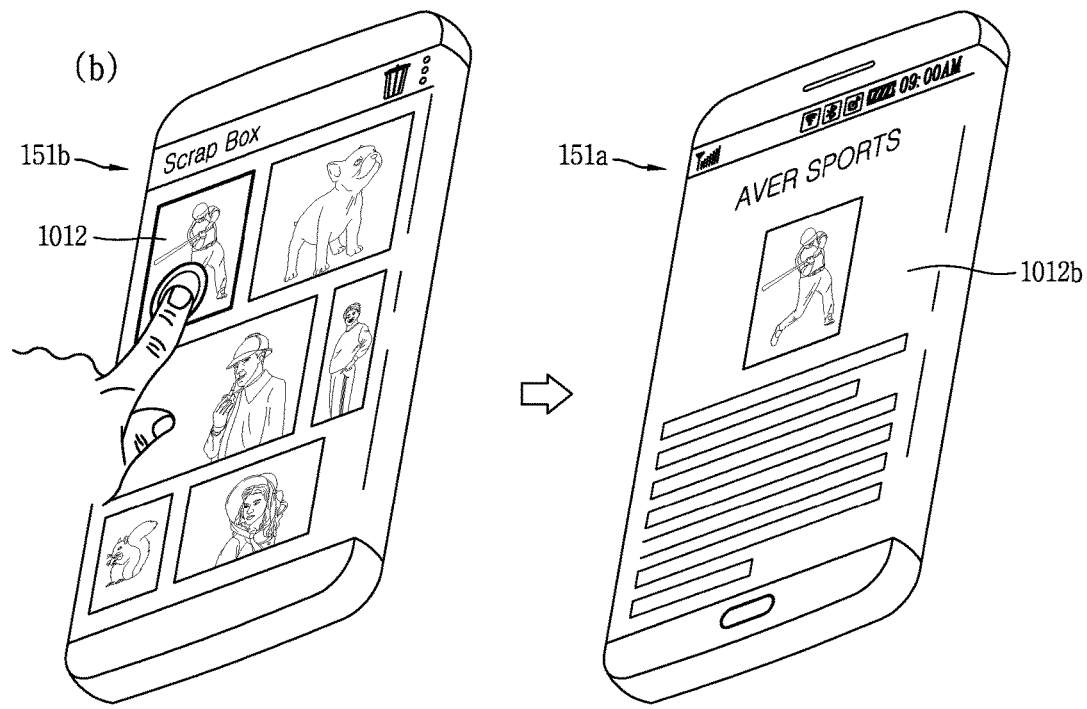

FIG. 11B
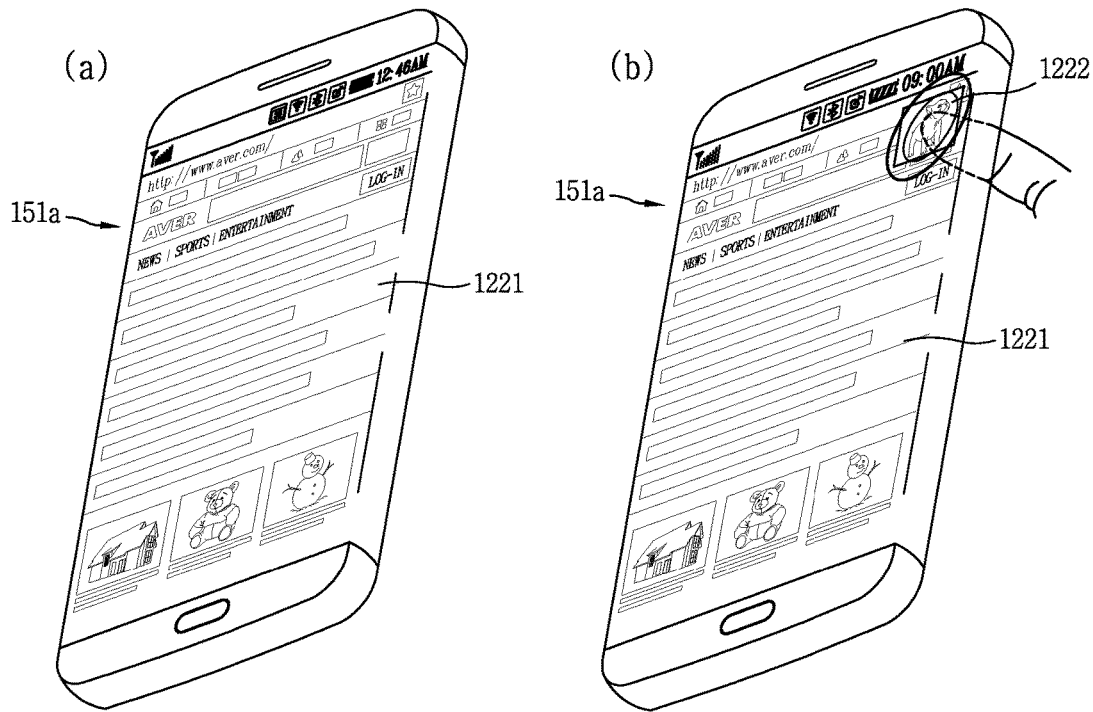
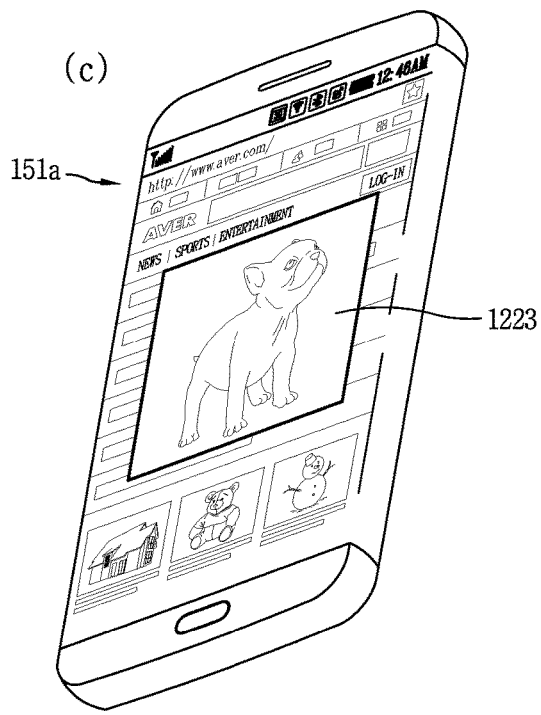

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2016-0062321 filed on May 20, 2016, the contents of which are hereby incorporated by reference herein in its entirety.

BACKGROUND OF THE INVENTION

1. Field of the Invention

The present disclosure relates to a mobile terminal allowing for touch input to a front surface and a rear surface thereof, and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Efforts are ongoing to support and increase the functionality of mobile terminals. Such efforts include software and hardware improvements, as well as changes and improvements in the structural components.

In the related art, a touch screen is provided on a front surface of a terminal to provide information to a user and receive a user input. Recently, in order to enhance user convenience, an information input/output region extends laterally.

In addition, flexible displays have been actively developed, and development of terminals having a new form using flexible displays are required.

SUMMARY OF THE INVENTION

Therefore, an aspect of the detailed description is to provide a mobile terminal allowing for touch input to a front surface and a rear surface thereof, and a control method thereof.

To achieve these and other advantages and in accordance with the purpose of this specification, as embodied and broadly described herein, a mobile terminal includes: a terminal body having a front surface, a side surface, and a rear surface; a touch screen disposed on the front surface and extending from the front surface to the side surface and the rear surface; and a controller performing controlling differently in relation to a graphic object output on a first region of the touch screen disposed on the front surface according to different types of touches applied to the graphic object, wherein when a first type of touch is applied to the graphic object output on the first region, the controller performs first controlling to execute a function associated with the graphic object, and when a second type of touch different from the first type of touch is applied to the graphic object output on the first region, the controller performs second controlling to output information related to the graphic object on a second region of the touch screen disposed on the rear surface.

In an embodiment, the controller may determine whether the touch screen is in a first state in which the first region of the touch screen faces a user or in a second state in which the second region faces the user, and when the touch screen is in the second state according to the determination result, the controller may control the touch screen to output information related to the graphic object on the second region.

In an embodiment, the graphic object may be an icon of a specific application, and in response to the second type of touch applied to the graphic object, the controller may deactivate a notification information output function regarding an event that occurs in the specific application.

In an embodiment, when the second type of touch is applied to information related to the graphic object output on the second region, the controller may activate the deactivated notification information output function.

In an embodiment, when the first type of touch is applied to the graphic object, the controller may output an execution screen of an application corresponding to the first graphic object on the first region, and when the second type of touch is applied to the graphic object, the controller may change a visual appearance of the graphic object and output information related to the graphic object on a third region disposed on the side surface of the touch screen in order to indicate that information related to the graphic object can be output on the second region.

In an embodiment, the graphic object may be a Web page corresponding to a specific URL address, and when the second type of touch is applied to the first region on which the Web page is output, the controller may generate a thumbnail image of the Web page and perform second controlling to output the thumbnail image on the second region.

In an embodiment, when the second type of touch is applied to the first region on which the Web page is output, the controller may output a guide image for setting a disposition position of the thumbnail image in the second region, and the disposition position of the thumbnail image may be specified in the second region on the basis of a touch direction of a drag touch continued from the second type of touch.

In an embodiment, when the second region is placed to face the user after the second controlling is performed, the controller may output the thumbnail image to the disposition position determined on the basis of the drag touch in the second region, and when the first type of touch is applied to the thumbnail image output on the second region, the controller may access the specific URL address to output the Web page again on the second region.

In an embodiment, when a preset type of touch is applied to a region in which the thumbnail image is disposed in the second region in a state in which the first region of the touch screen is placed to face the user, the controller may output the thumbnail image on the first region and process a function corresponding to screen information output on the first region and at least a portion of information of a Web page corresponding to the thumbnail image in an associated manner.

In an embodiment, when the second type of touch is applied to the thumbnail image output on the second region, the controller may output the Web page corresponding to the specific URL address on the first region.

To achieve these and other advantages and in accordance with the purpose of this specification, as embodied and broadly described herein, a mobile terminal including a terminal body having a front surface, a side surface, and a rear surface, includes: a touch screen disposed on the front surface; a touch panel disposed on the rear surface and sensing a touch input; and a controller outputting, when an event occurs in a second application different from a first application in a state in which screen information of the first application is output on the touch screen, a first graphic object indicating the occurrence of the event on the touch screen, wherein, in a state in which the first graphic object is output, when a preset first type of touch is applied to the touch panel disposed on the rear surface, the controller may output information related to the event on the touch screen, and when the first type of touch is released, the controller may terminate outputting of the information related to the event.

In an embodiment, when the first type of touch is applied to the touch panel disposed on the rear surface until a preset period of time has lapsed, the controller may switch screen information of the first application to an execution screen of the second application.

In an embodiment, when a second type of touch different from the first type of touch is applied to the touch panel disposed on the rear surface, the controller may switch screen information of the first application to an execution screen of the second application.

In an embodiment, the touch screen may extend from the front surface to the side surface, and when the second type of touch different from the first type of touch is applied, the controller may output an indicator corresponding to the first application on a touch screen region positioned on the side surface, and in response to a drag touch applied to the indicator, the controller may output screen information of the first application on a touch screen region disposed on the front surface.

In an embodiment, a rear touch screen including the touch panel may be disposed on the rear surface of the terminal body, and the controller may output screen information of the first application on any one of a touch screen region disposed on the front surface and the rear touch screen according to a drag direction of a drag touch applied to the indicator.

To achieve these and other advantages and in accordance with the purpose of this specification, as embodied and broadly described herein, a mobile terminal includes: a terminal body having a front surface, a side surface, and a rear surface; a touch screen disposed on the front surface and extending from the front surface to the side surface and the rear surface; and a controller performing, when a preset type of first touch is applied to first screen information disposed on the front surface of the touch screen, controlling to output the first screen information on a second region of the touch screen disposed on the rear surface, wherein the controller outputs a first graphic object guiding that the first screen information can be output on the second region, on a third region of the touch screen disposed on the side surface in response to the first touch, and the first screen information is output on the second region when the second region is activated.

In an embodiment, in response to the first touch, the controller may gradually change an output attribute corresponding to a visual appearance of the first screen information output on the first region, and the output attribute may include at least one of a display size, a color, transparency, and a depth value.

In an embodiment, when an output attribute corresponding to the visual appearance of the first screen information output on the first region satisfies a preset condition, the first screen information may disappear from the first region and second screen information different from the first screen information may be output on the first region.

In an embodiment, in response to a second touch applied to a first graphic object output on the third region, the controller may output the first screen information on any one of the first region and the second region, and to which of the first and second regions the first screen information is to be output may be determined on the basis of a touch direction of the second touch.

In an embodiment, a second graphic object corresponding to the second screen information may be output together with the first graphic object on the third region, and the second graphic object output on the first region may be arranged to be closer to the first region than the first graphic object.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 is a flow chart illustrating a method for utilizing a user input region disposed on a surface side of a mobile terminal according to an embodiment of the present disclosure.

FIGS. 4A and 4B are conceptual views illustrating examples to which the method illustrated in FIG. 3 is applied.

FIGS. 5A, 5B, 6A, 6B, 6C, 6D, and 6E are conceptual views illustrating a method for performing controlling in relation to an application by utilizing a user input region disposed on a rear surface of a mobile terminal.

FIGS. 7A, 7B, 7C, 8A, and 8B are conceptual views illustrating a method for performing controlling regarding a generated event by utilizing a user input region disposed on a rear surface of a mobile terminal.

FIGS. 9A, 9B, 10A, 10B, 10C, 11A, 11B, and 12 are conceptual views illustrating a method for performing a scrap function by utilizing a user input region disposed on a rear surface of a mobile terminal.

DETAILED DESCRIPTION OF THE INVENTION

Figure 1A:
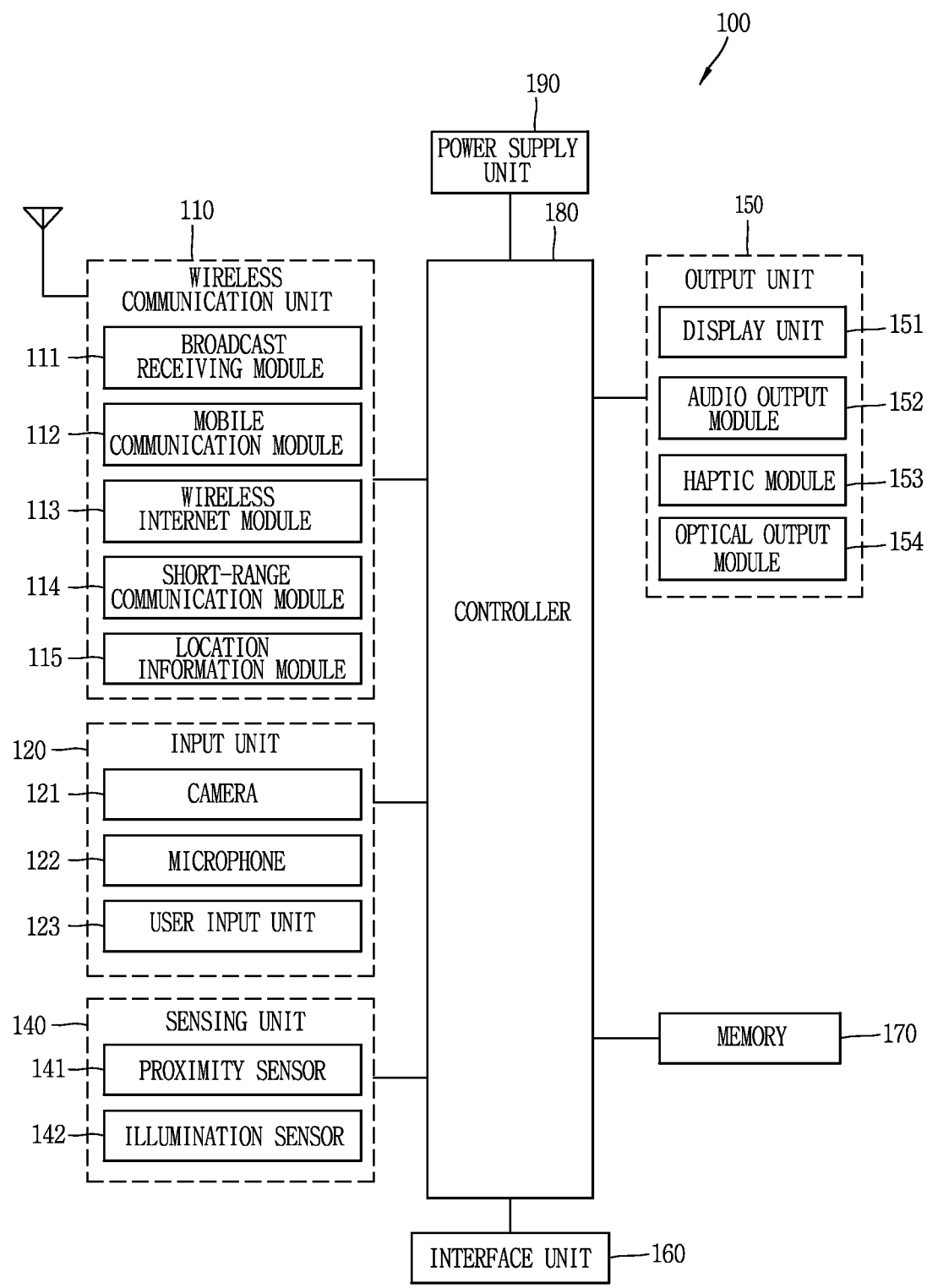
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
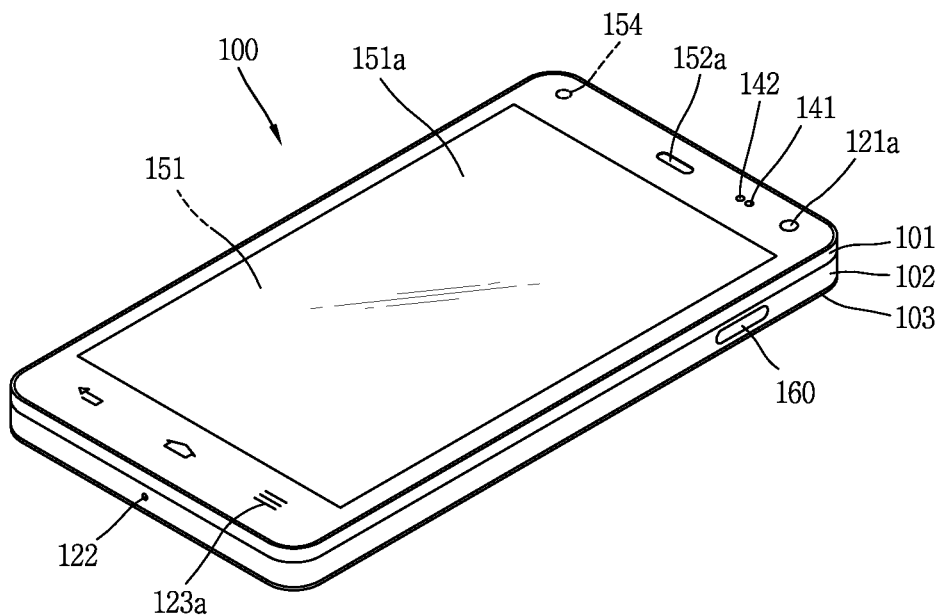
FIGS. 1B and 1C are conceptual views of one example of the mobile terminal, viewed from different directions.
Figure 1C:
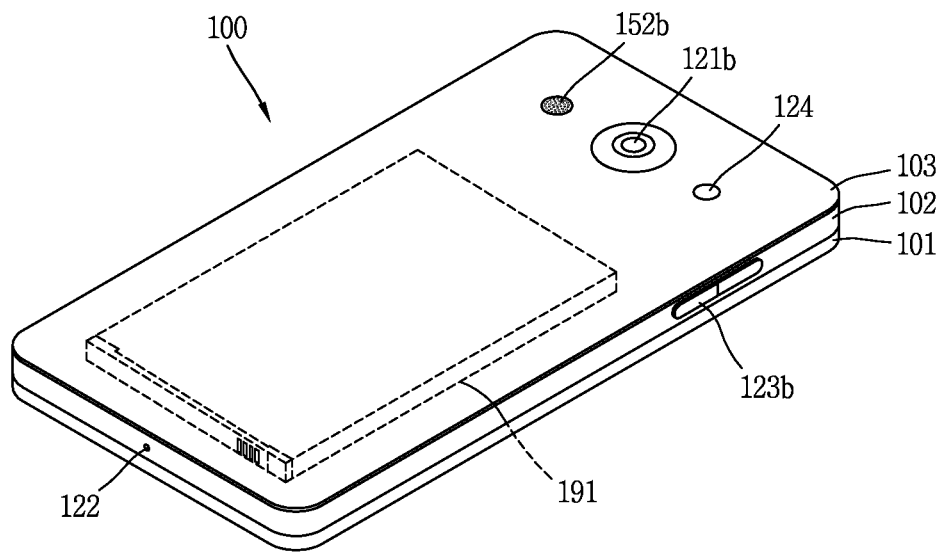

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the above, the mobile terminal having a single display region has been described. The mobile terminal according to the present disclosure may further include a plurality of display regions, as well as the single display region as discussed above. That is, the mobile terminal according to the present disclosure may provide convenience of controlling regarding the mobile terminal through the plurality of display regions.

Hereinafter, examples of a mobile terminal having a plurality of display regions will be described in detail with reference to the accompanying drawings.

Figure 2A:
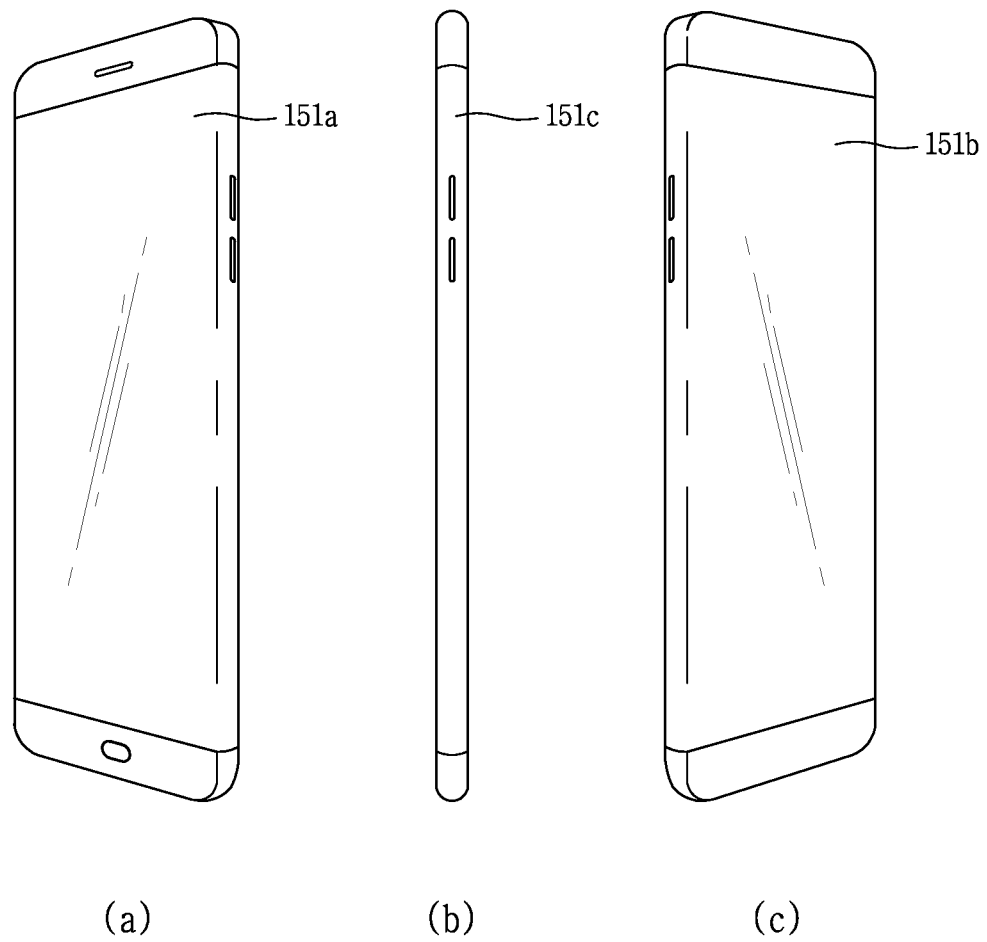
FIGS. 2A and 2B are conceptual views illustrating a mobile terminal according to an embodiment of the present disclosure.
Figure 2B:
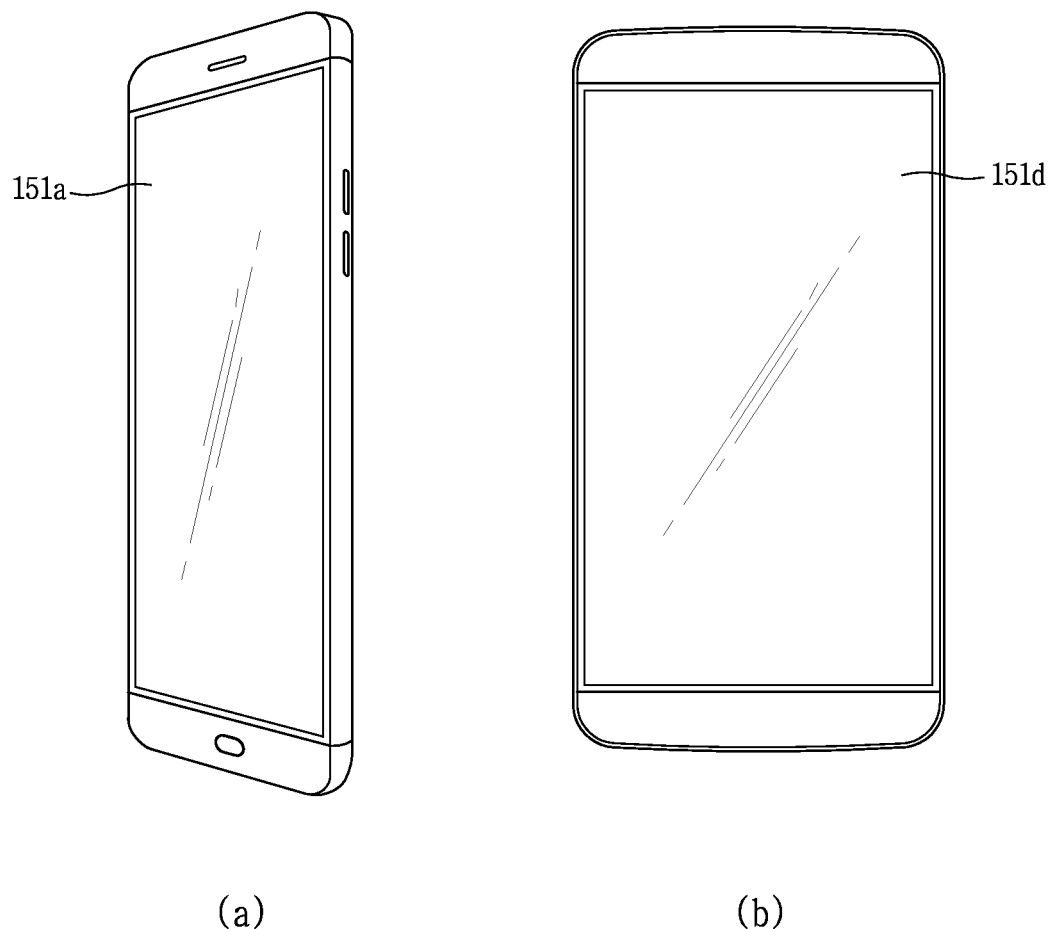

FIGS. 2A and 2B are conceptual views illustrating a mobile terminal according to the present disclosure.

First, as illustrated in FIG. 2A, a touch screen 151 (or a display) according to an embodiment of the present disclosure may have at least one additional touch screen on at least one of a side surface and a rear surface of the terminal body of the mobile terminal, in addition to a touch screen region 151a disposed on a front surface of the terminal body.

Thus, the touch screen 151 may include a plurality of touch screen regions 151a, 151b, and 151c.

The terminal body 100 may have a front surface, a rear surface and a side surface, and the first touch screen region 151a (a first region or a front touch screen region) may be disposed on a front surface of the terminal body, the second touch screen region 151b (a second region or a rear touch screen region0 may be disposed on a rear surface of the terminal body.

In addition, the third touch screen 151c (a third region or a side touch screen region0 may be disposed on a side surface of the terminal body.

Meanwhile, the touch screen according to an embodiment of the present disclosure may be implemented as a flexible display, and in this case, the first, second, and third touch screen regions 151a, 151b, and 151c may be included in the single touch screen 151 as illustrated in FIG. 2.

That is, the single touch screen 151 may include a plurality of touch screen regions 151a, 151b, and 151c.

Thus, the first, second, and third touch screen regions 151a, 151b, and 151c may be formed such that there is no physical differentiation or edges.

The second touch screen region 151b may extend from the first and third touch screen regions 151a and 151c.

Boundaries between the first, second, and third touch screen regions 151a, 151b, and 151c may form curved surfaces.

In this case, the boundaries of the plurality of touch screen regions 151a, 151b, and 151c may be differentiated by software processing.

The controller 180 may output a specific image on boundary regions of the plurality of touch screen regions 151a, 151b, and 151c to make the user to recognize the boundaries between a plurality of display regions.

Meanwhile, in this case, each of the plurality of touch screen regions 151a, 151b, and 151c may be independently controlled by software processing.

In another example, although not shown, the first, second, and third touch screen regions 151a, 151b, and 151c may have a physically independent structure.

In this case, the mobile terminal 100 may have a plurality of physically separated touch screens (for example, two or three or more display units).

When the mobile terminal according to an embodiment of the present disclosure has a plurality of physically differentiated touch screens, the controller controls the plurality of touch screens separately.

In this case, a sub-controller may be allocated to each of the touch screens to control each of the touch screens.

For example, in the mobile terminal, the first touch screen region 151a may be controlled by a first sub-controller, and the second touch screen region 151b may be controlled by a second sub-controller.

The first and second sub-controllers may be controlled by a main controller.

In another example, the physically differentiated first and second display units 151a and 151b may be controlled by a single controller.

As described above, the mobile terminal according to the present invention may have a plurality of touch screen regions (or a plurality of display units, hereinafter, referred to as "a plurality of touch screen regions") through physical or software differentiation.

Meanwhile, a touch applied to any one touch screen region among the plurality of touch screen regions may be processed as a control command for controlling another touch screen region.

Information output on any one touch screen region among the plurality of touch screen regions may be output to another region on the basis of a touch applied to a touch screen, and in this case, additional controlling related to the information may be performed.

In the mobile terminal according to an embodiment of the present disclosure, on the basis of a user input applied to a plurality of touch screen regions, user convenience in using the terminal and additional user interface may be provided through interworking between the plurality of touch screen regions.

Meanwhile, the mobile terminal according to an embodiment of the present disclosure may also have a touch panel on at least one of a side surface and a rear surface of the terminal body as illustrated in FIG. 2B, as well as having the plurality of touch screen regions as discussed above with reference to FIG. 2A.

As illustrated, a touch screen 151a is provided on the front surface of the terminal body, and a touch panel 151d may be disposed on the rear surface of the terminal body.

In this case, a control command for controlling information output on the touch screen 151a disposed on the front surface of the mobile terminal or a function of the mobile terminal may be applied through the touch panel 151d disposed on the rear surface of the terminal body.

In the following embodiment, the mobile terminal having the structure illustrated in FIG. 2A will be described, but the embodiments of the present invention may also be applied to the mobile terminal having the structure illustrated in FIG. 2B or a mobile terminal having a touch screen region only on a front surface or a rear surface.

Hereinafter, for the purposes of description, a touch screen region disposed on the front surface of the terminal body of the mobile terminal will be referred to as a first region 151a, a touch screen region disposed on the rear surface of the terminal body of the mobile terminal will be referred to as a second region 151b, and a touch screen region disposed on a side surface of the terminal body of the mobile terminal will be referred to as a third region 151c. According to circumstances, the third region may be provided all the side surfaces.

In addition, in a state in which any one region is activated (or an ON state), the controller 180 of the mobile terminal according to an embodiment of the present disclosure may control another region to be deactivated (or OFF state).

That is, when the user views any one of a plurality of regions, it is difficult for the user to view any other regions, and thus, in order to effectively use power, only any one of the plurality of regions may be maintained in an activated state.

Also, the controller may determine which region the user is viewing, among a plurality of regions, using one or a plurality of combinations of various sensors (an illumination sensor, a proximity sensor, a camera sensor, a gravity sensor, and the like) provided in the mobile terminal.

Also, the controller may control at least one region that the user is not viewing, among the plurality of regions, to be deactivated on the basis of the determination result.

In detail, in the mobile terminal according to an embodiment of the present disclosure, a plurality of touch screen regions (hereinafter, referred to as "a plurality of regions) may have the same driving state or different driving states.

Here, the plurality of regions may be driven to any one of an activated state and deactivated state.

The activated state may refer to a state in which visual information is displayed and a touch can be sensed. That is, the activated state refers to a state in which a corresponding touch screen region is turned on.

The deactivated state may refer to a state in which displaying of visual information is limited. That is, in this case, a lighting unit illuminating the corresponding display unit may be in an OFF state.

In the present disclosure, a touch screen region in a deactivated state may be configured to sense a touch. That is, in the present disclosure, a deactivated state may refer to a state in which displaying of visual information is limited and touch sensing is available (i.e., an applied touch may be sensed).

That is, the controller 180 may control a corresponding region such that a touch can be sensed in a region in a deactivated state.

Meanwhile, in the present invention, a state in which displaying of visual information is limited and touch sensing is available may be referred to as a doze mode, and in this case, the corresponding region may be expressed to be in the doze mode.

In this case, a region in the doze mode may be activated at every preset specific period.

Meanwhile, in a deactivated state (or a doze mode) and in an activated state, the touch sensor may sense a tap applied to the display unit 151 in different manners.

Also, setting related to operations of the touch sensor may be set different in the deactivated state (or doze mode) and the activated state.

For example, threshold values set for recognizing a touch may be set differently. That is, sensitivity regarding a touch of the touch sensor may be increased in the activated state, compared with the deactivated state (or the doze mode).

The reason is because the deactivated state (or the doze mode) may be a mode for sensing a touch, while reducing power consumption, and the activated state may be a mode for accurately sensing a user input.

Meanwhile, when a first touch is sensed in the deactivated state, the controller 180 may drive the touch sensor in a region in a deactivated state such that a sensing period thereof is equal to a touch sensing period of a display region in an activated state.

This is to increase accuracy of a touch applied to the display region even in the deactivated state.

In this case, the touch sensing unit of the region in the deactivated state may be driven at touch sensing periods of different periods even in the deactivated state.

For example, before a first touch is applied, the controller 180 may sense a touch at a first frequency, and when the first touch is applied, the touch may be sensed at a second frequency faster than the first frequency.

Also, while the touch sensor is being driven at the second frequency, if a following touch is not applied for a preset period of time, the controller 180 may drive the touch sensor at the second frequency again.

In this manner, in the present disclosure, a driving scheme of the touch sensor is variously deformed, whereby accuracy of a touch can be enhanced, while minimizing power consumption of the mobile terminal.

Meanwhile, each of a plurality of regions of the mobile terminal according to an embodiment of the present disclosure may be driven in any one of an activated state and a deactivated state.

In addition, in the mobile terminal according to an embodiment of the present disclosure, any one of the plurality of regions may be constantly in an activated state.

That is, in this case, the display region in the constantly activated state may be expressed as "being always on"

In this case, the region in always-on state may also be driven in a deactivated state according to a remaining capacity of a battery of the mobile terminal.

In the mobile terminal driven as described above, on the basis of a preset type of touch applied to any one of a plurality of regions, a graphic object (or an image) to which a touch is applied may be variously controlled.

For example, when a preset type of touch is applied to a specific graphic object output on any one region, the controller 180 may allow the graphic object to be controlled in the any one region and in another region.

In the present invention, a specific application, a specific event, or specific information may be controlled in an interworking manner (or cooperatively) by utilizing a plurality of touch regions. Hereinafter, a method for utilizing a plurality of regions will be described. FIG. 3 is a flow chart illustrating a method for utilizing a user input region disposed on a rear surface of a mobile terminal according to an embodiment of the present disclosure, and FIGS. 4A and 4B are conceptual views illustrating examples to which the method illustrated in FIG. 3 is applied.

Hereinafter, a method for performing controlling on an application using a plurality of touch screen regions will be described.

In the mobile terminal according to an embodiment of the present disclosure, a graphic object is output on a front display region (hereinafter, referred to as a "first region 151a") (S310). Here, the graphic object may be an icon of an application as illustrated in (a) of FIG. 4A. As illustrated, icons 401 and 401a respectively corresponding to at least one application may be output on the first region 151a. The icons of the application may be output on a home screen page or a specific menu screen. Hereinafter, the icons of the application will be generally referred to as a "graphic object".

In response to a touch input applied to the graphic objects 401 and 401a, the controller 180 may perform various controlling on the graphic objects to which a touch has been applied.

As illustrated, in a state in which the graphic objects 401 and 401a are output on the first region 151a, a touch applied to the graphic objects output on the first region 151a is sensed (S320). That is, the user may apply a touch to any one of the graphic objects 401 and 401a output on the first region 151a to execute an application corresponding to the touch-applied specific graphic object, output an execution screen of the application corresponding to the specific graphic object, or perform controlling related to the application corresponding to the specific graphic object.

The controller 180 may perform controlling differently according to a touch scheme of a touch applied to the graphic object, and here, the touch scheme is defined by at least one of the number of touches, a touch strength, a touch pressure, a touch pattern (e.g., a dragging gesture, or the like), and a touch maintaining time, and a touch corresponding to a first touch scheme and a touch corresponding to a second touch scheme may be touches in which at least one of the examples numerated above is different.

As illustrated in (b) and (c) of FIG. 4A, when a touch applied to a specific graphic object (or any one graphic object 401a) among the graphic objects 401 and 401a output on the first region 151a is sensed, the controller 180 performs different controlling related to the specific graphic object 401 according to different touches or different touch schemes.

When a first type of touch is applied to the specific graphic object 401a output on the first region 151a (S330), the controller 180 performs first controlling such that a function associated to the specific graphic object 401a is executed (S340), and when a second type of touch different from the first type of touch is applied to the specific graphic object 401a output on the first region 151a, the controller 180 performs second such that information related to the specific graphic object 401a is output on the second region 151b disposed on the rear surface of the touch screen 151 (S350).

The first type of touch and the second type of touch may be touches having different touch strengths. Here, the second type of touch may have greater touch strength than that of the first type of touch, and the controller 180 may sense a strength of a touch through a sensor displayed in the touch screen 151, or the like, and when the sensed strength of the touch satisfies a reference condition, the controller 180 determines the touch as a second type of touch.

Here, the first type of touch may generally correspond to a short touch for selecting the specific graphic object 401a. That is, the first type of touch may generally correspond to a short touch for selecting a specific graphic object 401a. That is, the first type of touch may be a touch type for selecting a specific graphic object or a specific menu from the terminal. When a first type of touch is applied, an execution screen of an application corresponding to the specific graphic object 401a may be output as illustrated in (b) of FIG. 4A. That is, a function (first function) for executing the application corresponding to the specific graphic object 401a may have been allocated to the first type of touch.

An additional function related to the specific graphic object 401a and an application corresponding to the specific graphic object 401a may have been allocated to the second type of touch, and in the present invention, the additional function is a function (second function) enabling the application corresponding to the specific graphic object 401a to be controlled also in the second region 151b disposed on the rear surface.

When the second type of touch is applied to the specific graphic object 401a, the controller 180 may change a scheme in which the specific graphic object 401a is output, in order to cause the user to recognize that the specific graphic object 401a can be controlled in the second region 151b.

When the second type of touch is applied to the specific graphic object 401a in a state in which the first region 151a is placed to face the user (this state may be recognized through a sensing unit), the controller 180 may control displaying of the specific graphic object 401a to be different from that before the second type of touch is applied.

The controller 180 may display the specific graphic object 401a and the other graphic object 401 in different depths. In this case, a layer on which the specific graphic object 401a is displayed and a layer on which the other graphic object 401 are displayed may be different. That is, the layers may have different depths and overlap each other.

Here, the layers may be a sort of virtual planes including screen information output on the touch screen. Unless a plurality of layers overlap, the controller 180 may control the display unit 151 to include screen information on the same layer.

When the second type of touch is applied to the specific graphic object 401a, the controller 180 may output the specific graphic object 401a at a different depth in order to indicate that the specific graphic object 401a may be output in the second region 151b disposed on the rear surface.

The controller 180 may display the specific graphic object 401a at a different depth for a predetermined period of time with respect to a point in time at which the second type of touch is applied, and when the predetermined period of time has lapsed, the controller 180 may change displaying of the specific graphic object 401a. The controller 180 may display the specific graphic object 401a to be reduced or display the specific graphic object 401a to be dim, or may not display the specific graphic object 401a.

Meanwhile, the controller 180 determine whether the touch screen is in a first state in which the first region of the touch screen faces the user or in a second state in which the second region of the touch screen faces the user. When the touch screen is in the second state, the controller 180 may control the touch screen to output information related to the specific graphic object 401a.

That is, as discussed above, in order to save power, when any one of the first and second regions 151a and 151b is turned on, the other may be operated in an OFF state. When the touch screen is in the second state, the first region may be in an OFF state.

Meanwhile, when the touch screen is in the second state in which the second region is placed to face the user, the controller 180 may output the specific graphic object 401a on the second region 151b as illustrated in (a) of FIG. 4B.

That is, in response to the second type of touch applied to the specific graphic object 401a, the controller 180 may output the specific graphic object 401a on the second region 151b. Here the user may feel a psychological effect that, when the second type of touch is applied to the specific graphic object 401a in the first region 151a, the specific graphic object 401a is moved to the second region 151b.

Meanwhile, even in the second region 151b, the controller 180 may perform different functions regarding different types of touch applied to the specific graphic object.

As illustrated in (a) of FIG. 4B, when the first type of touch is applied to the specific graphic object 401a output in the second region 151b, the controller 180 may output an execution screen 410 of an application corresponding to the specific graphic object 401a on the second region 151b. That is, a function (first function) of executing the application corresponding to the specific graphic object 401a may be allocated to the first type of touch, and this may be common, no matter whether the first type of touch is applied to the first region 151a or to the second region 151b.

In addition, similarly, the specific graphic object 401a and an additional function related to an application corresponding to the specific graphic object 401a have also been allocated to the second type of touch, and in the present disclosure, the additional function is a function (second function) enabling the specific graphic object 401a to be controlled also in the first region 151a when the second type of touch is applied to the specific graphic object 401a output on a region (e.g., the second region 151b) different from the region on which the specific graphic object 401a is currently output.

When the second type of touch is applied to the specific graphic object 401a, the controller 180 may change a scheme in which the specific graphic object 401a is output, in order to cause the user to recognize the fact that the specific graphic object 401a can be controlled on the second region.

When the second type of touch is applied to the specific graphic object 401a output on the second region 151b, the controller 180 may not output the specific graphic object 401a on the second region 151b any longer.

In response to the second type of touch applied to the specific graphic object 401a output on the second region 151b, the controller 180 may control the touch screen such that outputting of the specific graphic object 401a on the second region 151b is terminated and the specific graphic object 401a is output only on the first region 151a as illustrated in (b) of FIG. 4B.

In this manner, in the mobile terminal according to the present disclosure, in response to a specific type of touch applied to a graphic object output on any one region, the graphic object may also be output on another region different from the one region, whereby a plurality of touch screen regions may be variously utilized according to circumstances.

Meanwhile, in a state in which the specific graphic object 401a is displayed on the second region 151b, the specific graphic object 401a may not be displayed on the first region 151a, may be displayed to be reduced in size, may be displayed at a depth different from that of another graphic object, or may be displayed to be dim.

Meanwhile, in the present disclosure, in addition to changing the region on which a graphic object is displayed in response to the second type of touch, an application corresponding to the graphic object may also be additionally controlled.

Hereinafter, in response to a specific type of touch (or a preset type of touch, e.g., a touch applied with pressure of a preset value or greater) applied to information output on the touch screen, an application may be controlled. Hereinafter, a method for controlling an application will be described in detail with reference to the accompanying drawings.

FIGS. 5A, 5B, 6A, 6B, 6C, 6D, and 6E are conceptual views illustrating a method for performing controlling in relation to an application by utilizing a user input region disposed on a rear surface of a mobile terminal.

Figure 5A:
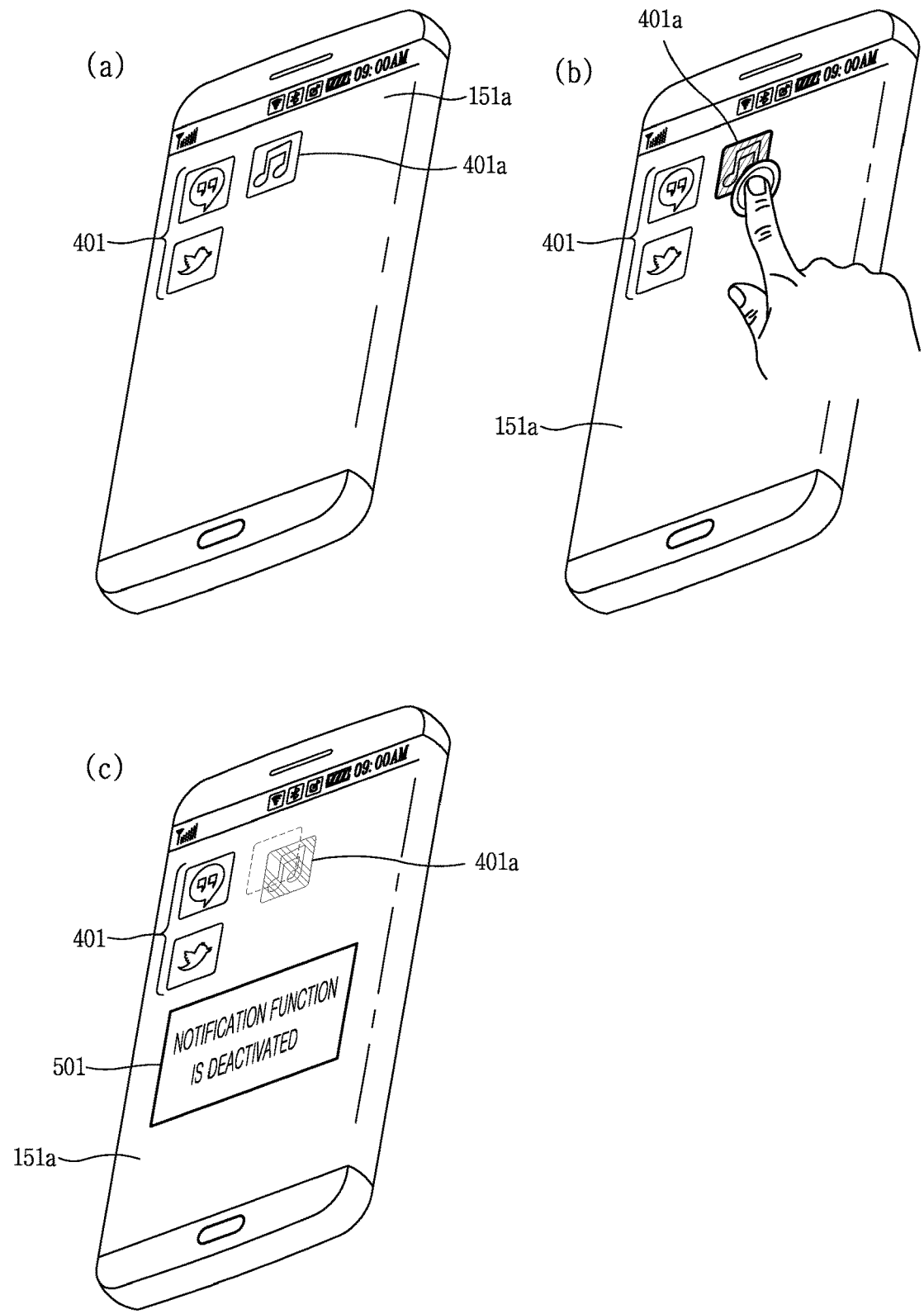

For example, as illustrated in (a) and (b) of FIG. 5A, when the second type of touch (e.g., a touch applied with pressure of a preset value or greater) is applied to the specific graphic object 401a as mentioned above, the controller 180 may change a display method and a display region of the specific graphic object 401a and control an application corresponding to the specific graphic object 401a. For example, when the second type of touch is applied to the specific graphic object 401a, the controller 180 may deactivate a notification information output function regarding an event that occurs in the specific application. In this case, although an event occurs in the application corresponding to the specific graphic object 401a, event notification information may not be output.

Also, conversely, as illustrated in FIG. 5B, when the second type of touch is applied to the specific graphic object 401a output on the second region 151b or information related to the specific graphic object 401a, the deactivated notification information output function may be activated.

In this case, in response to the second type of touch, the controller 180 may output the specific graphic object 401a again on the first region 151a as illustrated in (c) of FIG. 5B.

Also, in addition to the content described above, in the mobile terminal according to the present disclosure, various types of controlling related to an application output on the first region 151a may be performed. For example, when the second type of touch (e.g., a touch applied with pressure of a preset value or greater) is applied to the specific graphic object 401a, the controller 180 may change a display method and a display region of the specific graphic object 401a and may control an application corresponding to the specific graphic object 401a (for example, may perform various functions such as i) a function of hiding an icon of the application from a home screen page, ii) a function of limiting event notification regarding a specific person, and iii) a function of limiting execution of the application on the first region 151a), as described above with reference to FIGS. 4A and 4B.

In this manner, when the first type of touch is applied to the specific graphic object 401a, the controller outputs an execution screen of the application corresponding to the specific graphic object on the first region 151a. Also, when the second type of touch is applied to the specific graphic object 401a, the controller may change a visual appearance of the specific graphic object 401a in the first region 151a in order to indicate that information related to the specific graphic object 401a may be output on the second region 151b. In addition, in the present disclosure, information related to the specific graphic object 401a may also be output on the third region 151c disposed on the side surface of the touch screen.

In the above, controlling the graphic object corresponding to the icon of the application has been described. Hereinafter, a method for controlling an application in response to different touch types applied to an execution screen of an application will be described.

In the mobile terminal according to the present disclosure, when a specific type of touch is applied to the touch screen, screens of applications may be switched. Here, the specific type of touch may be a touch applied with pressure of a preset value or greater.

As illustrated in (a) of FIG. 6A, in a state of multi-tasking a plurality of applications, when an execution screen 601 of a first application is output as a main screen 601 and the specific type of touch is applied to the first region 151a (or the second region 151b), an execution screen 602 of a second application different from the first application may be output as a main screen on the first region 151a as illustrated in (b) of FIG. 6A. The second application may be one of applications multi-tasked with the first application.

The second application may be an application of high priority according to a preset criterion, among a plurality of multi-tasked applications, or may be an application which has been output on the first region 151a before the first application is output on the first region 151a.

The controller 180 may switch the application output on the first region 151a in response to the specific type of touch. Here, controller 180 may perform control to output the execution screen of the first application on the second region 151b. When it is sensed that the user is viewing the second region 151b, the controller 180 may output the execution screen 601 of the first application on the second region 151b as illustrated in (c) of FIG. 6A. For example, when it is sensed through a camera sensor that the user is viewing the second region 151b or when it is sensed through a gyro sensor that the terminal is rotated, the controller 180 may activate the second region 151b and output the execution screen 601 of the first application.

Meanwhile, the execution screen of the application output on the second region 151b may be output on the first region 151a again on the basis of the specific type of touch applied to the second region.

Meanwhile, the first application and the second application may be included in different layers, and the controller 180 may switch layers output on the main screen according to the specific type of touch.

As well as switching a layer output on the main screen in response to the specific type of touch, the controller 180 may output a graphic image 610a indicating a layer in which the execution screen of the first application is included, on the third region 151c corresponding to the side surface of the touch screen 151 as illustrated in (b) of FIG. 6A.

In response to a touch (e.g., a drag touch toward the first region 151a) applied to the graphic image 610a, the controller 180 may output the execution screen of the first application again on the first region 151a.

Figure 6B:
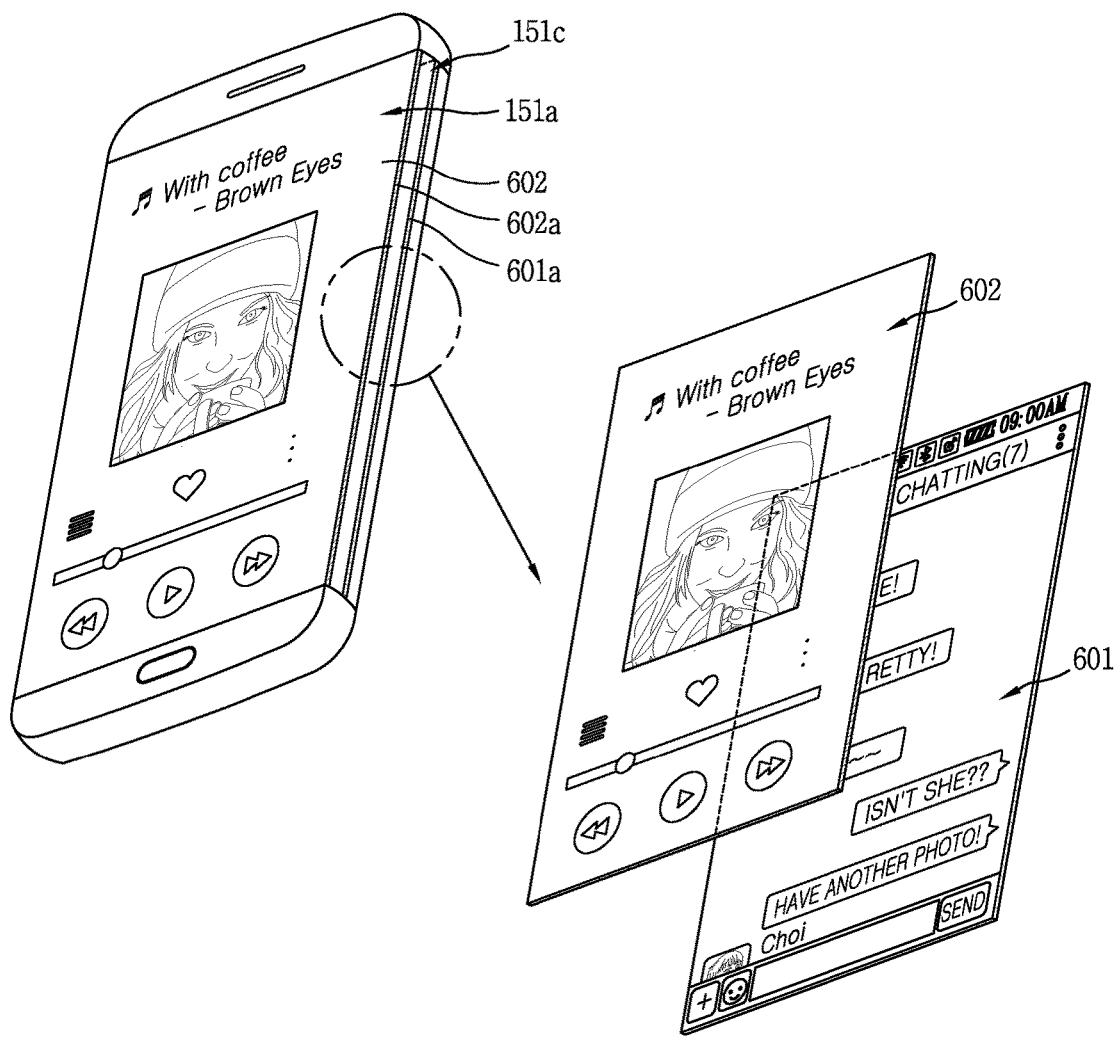

In detail, as illustrated in FIG. 6B, graphic images 601a and 602a respectively corresponding to the execution screens 601 and 602 of the first and second applications may be output on the side region 151c. In response to a touch applied to the side region 151c, the controller 180 may change an arrangement of the graphic images 601a and 602a, and may switch execution screens displayed on the first region 151a in response to the change in the arrangement.

Meanwhile, in addition to the first and second applications, a graphic image corresponding to at least another application under multi-tasking may be output on the side region. Thus, the user may easily recognize which of the applications are multi-tasked, and in response to a touch applied to any one of the graphic images, the controller 180 may output an execution screen of an application corresponding to the graphic image to which the touch has been applied, whereby screens of the applications may be easily switched.

Meanwhile, although the plurality of applications are being multi-tasked, the controller 180 may specify an execution screen of an application output on the second region 151*b*, a rear surface region, as an execution screen to which the specific type of touch has been applied.

Figure 6C:
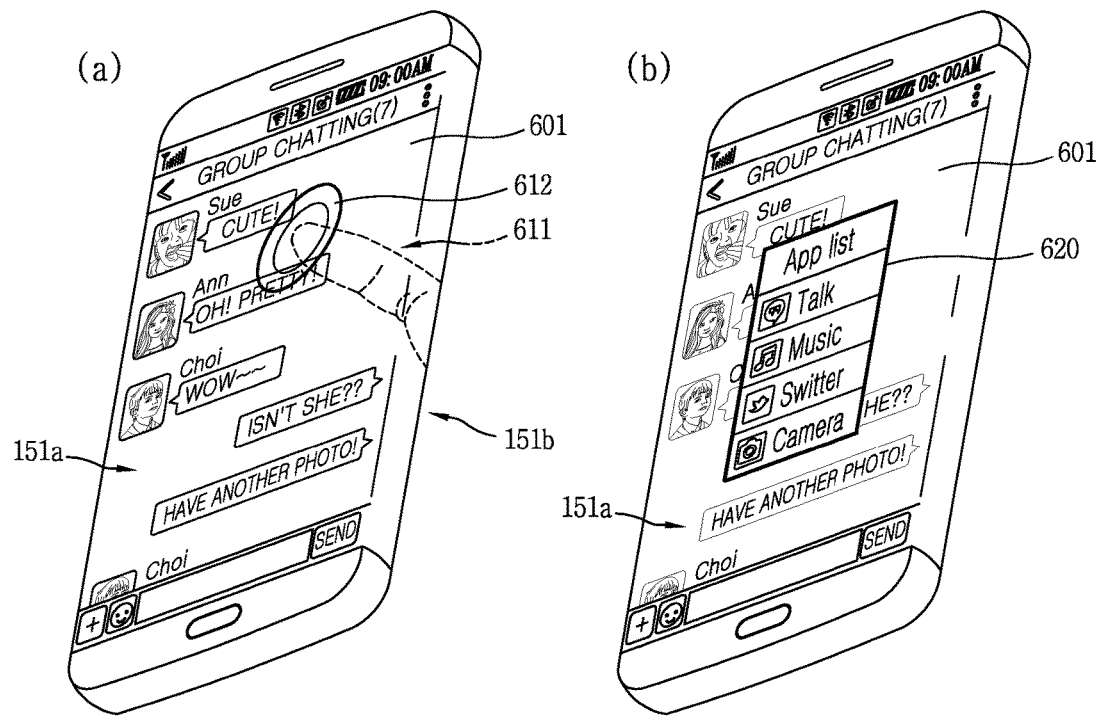

In addition, in the present disclosure, in response to the specific type of touch applied to the second region 151*b* as illustrated in (a) of FIG. 6C, a list 620 of multi-tasked applications may be output as illustrated in (b) of FIG. 6C.

As discussed above, even in a deactivated state, the second region 151*b* may be configured to sense a touch applied thereto, and when a touch is applied to the second region 151*b*, the controller 180 may output indicators 611 and 612 to regions corresponding to positions to which the touch has been applied on the first region 151*a* and the second region 151*b*. The indicators 611 and 612 may be configured as a finger image.

Meanwhile, items included in the list of the applications under multitasking may be selected by applying a touch to any one of the first region 151*a* and the second region 151*b*, and the controller 180 may output an execution screen of an application corresponding to the selected item to any one of the first region and the second region. To which of the first and second regions the execution screen of the application corresponding to the selected item is to be output may be determined on the basis of to which a touch for selecting the item has been applied.

In a case in which the item is selected by a touch applied to the first region 151*a*, the controller 180 may output an execution screen of an application corresponding to the selected item on the first region 151*a*. Also, in a case in which the item is selected by a touch applied to the second region 151*b*, the controller 180 may output the execution screen of the application corresponding to the selected item on the second region 151*b*.

Figure 6D:
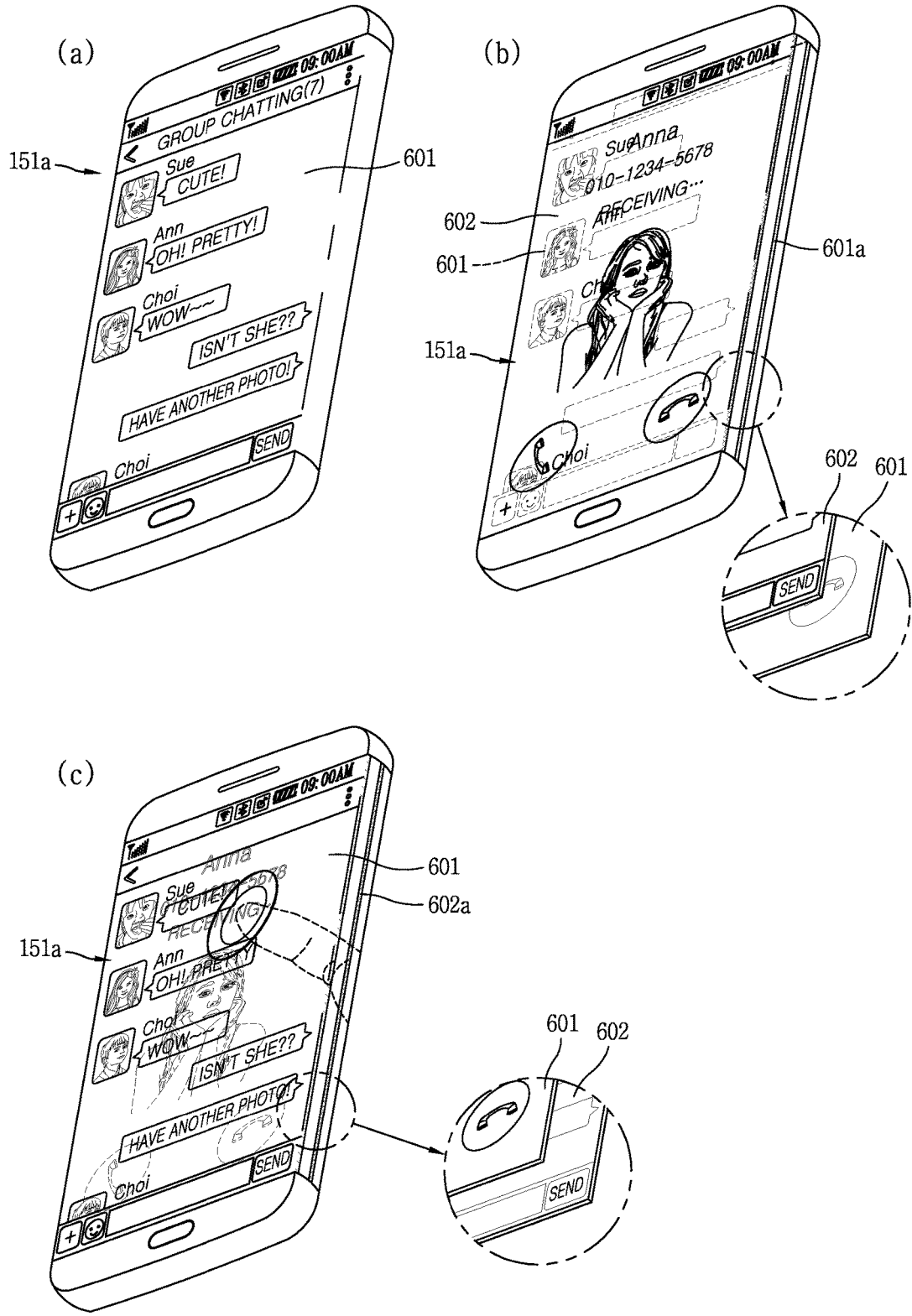

In another example, as illustrated in (a) of FIG. 6D, in a state in which the execution screen 601 of the first application is displayed on the first region 151*a*, when an event occurs in the second application, the controller 180 may output an execution screen 602 of the second application on the first region 151*a* as illustrated in (b) of FIG. 6D, instead of the execution screen 601 of the first application. In this case, when the terminal has been rotated at an angle corresponding 180 degrees or when the second region 151*b* is placed to face the user (for example, the touch screen is placed in the second state), the controller 180 may output the execution screen 601 of the first application on the second region 151*b*. Here, the second application may be an application having higher priority in output than that of the first application (for example, a call-related application may have the highest priority).

Meanwhile, as illustrated in (b) of FIG. 6D, the controller 180 may output a graphic image 601*a* corresponding to the execution screen 601 of the first application on the side region 151*c*. The controller 180 may recognize that the execution screen 601 of the first application may be continuously used through the second region 151*b*, through the graphic image 601*a*. In this case, the graphic image 601*a* may be referred to as an indicator. In addition, in response to a touch applied to the third region 151*a*, the side region, the controller 180 may output an execution screen corresponding to the graphic image 601*a* on the first region 151*a*. In addition, in response to a touch applied to the graphic image 601*a*, the controller 180 may activate the second region 151*b* and output the execution screen 601 of the first application on the second region 151*b*.

In addition, as illustrated in (c) of FIG. 6D, in response to a touch applied to the second region 151*b*, the controller 180 may output the executions screen 601 of the first application again on the first region 151*a*. In this case, the second application has been continuously executed, and a graphic image 602*a* corresponding to the second application may be output on the third region 151*c*, the side region.

Meanwhile, when the execution screens of the first and second applications are switched, the controller 180 may not directly switch the execution screens of the first and second applications but gradually changes a depth of the first output execution screen to provide a graphic effect that the first output execution screen is moved to the rear surface, allowing the user to recognize that the first output execution screen may be used on the rear surface of the terminal.

Figure 6E:
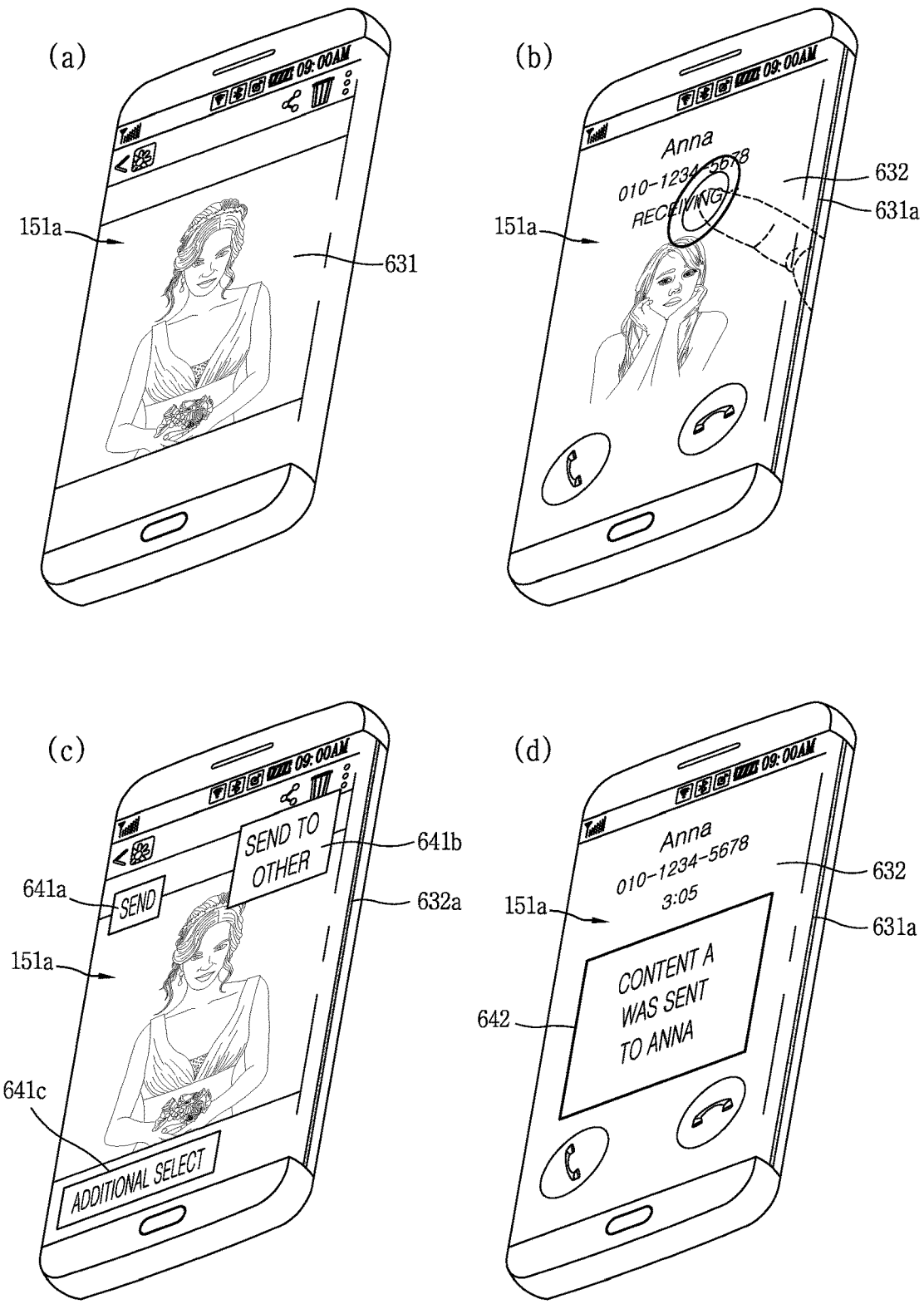

In addition, in the present disclosure, as illustrated in FIG. 6E, in a state in which an execution screen 631 of the first application is displayed on the first region 151*a*, when an event occurs in the second application, the controller 180 may output an execution screen 632 of the second application on the first region 151*a* as illustrated in (b) of FIG. 6E, instead of the execution screen 631 of the first application. In this case, when the terminal has been rotated at an angle corresponding to 180 degrees or when the second region 151*b* is placed to face the user (for example, when the touch screen is placed in the second state), the controller 180 may output the execution screen 631 of the first application. Here, the second application may be an application having higher priority in output than that of the first application (for example, a call-related application may have the highest priority). In addition, in a state in which the execution screen 632 of the second application is output on the first region, when a touch is applied to the second region 151*b* as illustrated in (b) of FIG. 6E, the controller 180 may control the first application and the second application in an interworking manner as illustrated in (c) of FIG. 6E. For example, the controller 180 may use information provided through the first application, in the second application. As illustrated in (c) of FIG. 6E, in response to the touch applied to the second region 151*b*, function icons 641*a*, 641*b*, and 641*c* may be output on the first region 151*a* in order to associate information provided through the first application to the second application.

When any one of the function icons 641*a*, 641*b*, and 641*c* is selected, for example, as illustrated in (d) of FIG. 6E, information (or content) provided through the first application may be utilized in the second application and the controller 180 may transmit the content to a counterpart terminal through the second application.

Meanwhile, the screen illustrated in (c) of FIG. 6E may also be provided in the second region 151*b*.

As discussed above, in the mobile terminal according to the present disclosure, switching of screens of applications is controlled by applying a touch to a plurality of regions, and in addition, a switched screen of an application is continuously provided through another region, thus enhancing user convenience.

Meanwhile, in the mobile terminal according to the present disclosure, in a case in which an event occurs in at least one of previously installed applications, event information corresponding to the generated event may be output on the mobile terminal. The event information may be provided in a list form in the terminal, and according to circumstances, the touch screen 151 may be controlled to output the specific event information output on the first region 151a, to the second region 151b on the basis of a user selection.

In this case, regarding an application corresponding to the specific event, the controller may perform additional controlling related to an event output or event alarm, and hereinafter, a method for controlling an event by utilizing a plurality of regions will be described in detail with reference to the accompanying drawings.

FIGS. 7A, 7B, 7C, 8A, and 8B are conceptual views illustrating a method for performing controlling regarding a generated event by utilizing a user input region disposed on a rear surface of a mobile terminal.

Here, the event is an event that occurs in an application installed in the mobile terminal such as schedule alarm, timer completion alarm, and the like, like a message reception event, a call reception event.

Here, the event may occur in response to information received from the outside or may occur when an operation performed in an application is completed.

As illustrated in (a) of FIG. 7A, when event occur in one or more applications, the controller 180 may output the generated event information in the form of a list 701 on the first region 151a.

The list 701 may be provided in various environments in the mobile terminal, and for example, the list 701 may be output on a locked screen or through a notification region output according to a user selection.

In a state in which the list 701 is output as illustrated, when a specific type of touch (for example, a touch applied with pressure of a preset value or greater) is applied to the item 710 corresponding to a specific event, the controller 180 may terminate outputting of the item 710 on the first region 151a as illustrated in (c) and (d) of FIG. 7A. The list 701 is updated as illustrated in (d) of FIG. 7A (see, 701a).

Figure 7B:
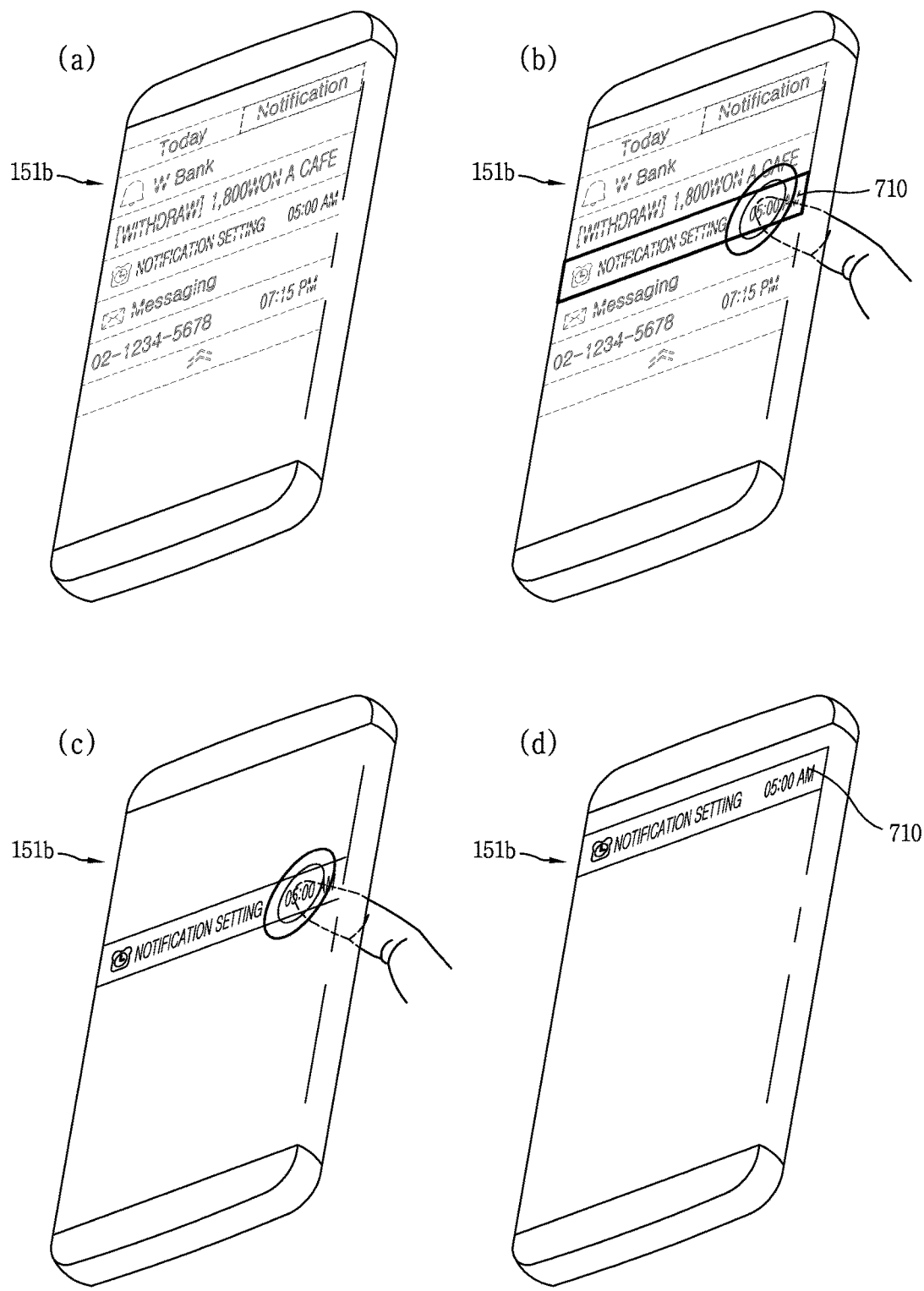

In this manner, the item to which the specific type of touch has been applied may be output on the second region 151b as illustrated in FIG. 7B. When the second region 151b is activated, the controller 180 may output the item 710 on the second region 151b as illustrated in (d) of FIG. 7B. (a), (b), and (c) of FIG. 7 illustrate views in the second region 151b when a touch is applied in the first region 151a (for the purposes of description, the terminal is illustrated by rotating 180 degrees, but substantially the terminal should be reversed horizontally).

Meanwhile, as illustrated in FIG. 7A, when the specific type of touch is applied to the specific item 710 in the first region 151a, a visual effect such as moving the specific item 710 to the second region 151b by gradually changing a depth of the specific item 710 may be provided.

In addition, when outputting of the specific item 710 is terminated, as illustrated in (d) of FIG. 7A, the controller 180 may output a list 701a excluding the specific item 710.

Meanwhile, when the specific type of touch is applied to the specific item 710, the controller 180 may limit outputting of event notification information indicating that an event has occurred in an application corresponding to the specific item 710.

In this case, the notification information regarding the event in the application corresponding to the specific item 710 may be output only on the second region 151b. That is, the controller 180 may utilize the specific type of touch as an event notification function termination command. In addition, the controller 180 may deactivate outputting of only the notification information regarding the event related to the specific item 710.

For example, in a case in which the specific item 710 is an event regarding a specific person, the controller 180 may not output notification of the event (for example, a message received from the specific person) related to the specific person on the first region 151a or may deactivate outputting of event notification information.

In addition, in response to the specific type of touch applied to the specific item 710 in the second region 151b, the controller 180 may move the specific item 710 again to the first region 511a, and in this case, the controller 180 may activate again outputting of only notification information regarding the event related to the specific item 710.

Figure 7C:
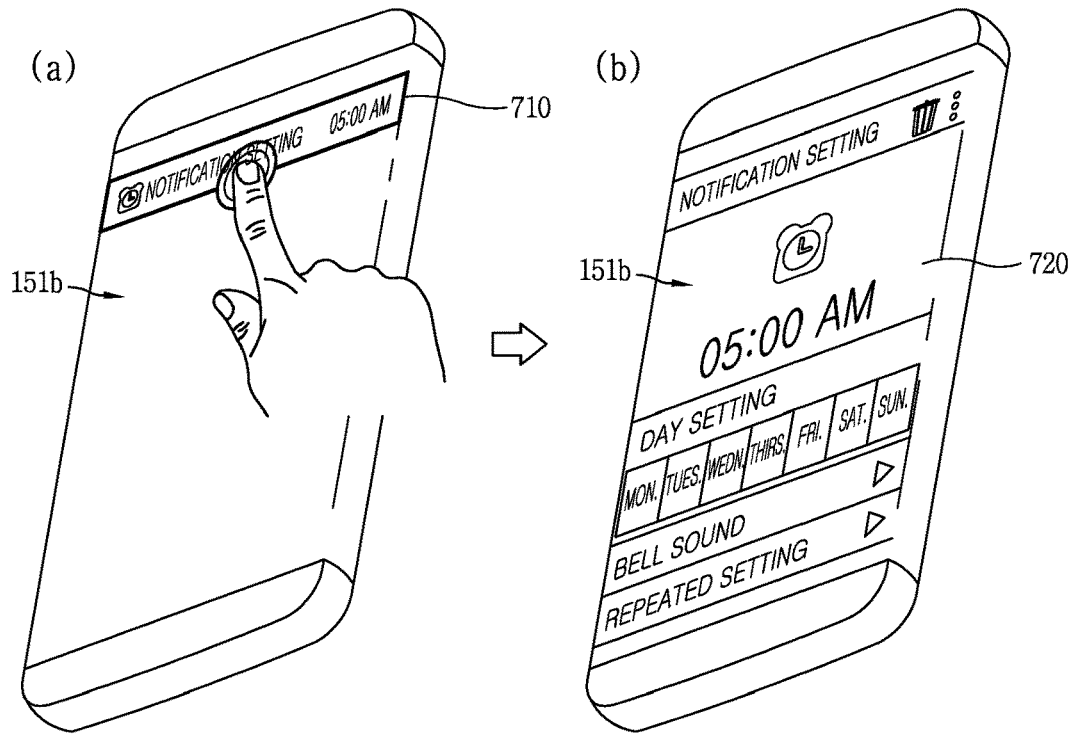

Also, as illustrated in (a) of FIG. 7C, when the first type of touch described above is applied to the specific item 710 output on the second region 151b, the controller 180 may output an execution screen 720 of an application corresponding to the specific item 710 on the second region 151b as illustrated in (b) of FIG. 7C.

When the second type of touch described above is applied to the specific item 710 output on the second region, the controller 180 may output an execution screen 720 of an application corresponding to the specific item 710 on the second region 151b as illustrated in (b) of FIG. 7C.

Also, when the second type of touch described above is applied to the specific item 710 output on the second region 151b, the controller 180 may output the execution screen 710 of the application corresponding to the specific item 710 on the first region 151a as illustrated in (c) of FIG. 7C.

In this case, when an event notification function related to the specific item is activated, the controller 180 may activate it again.

Figure 8A:
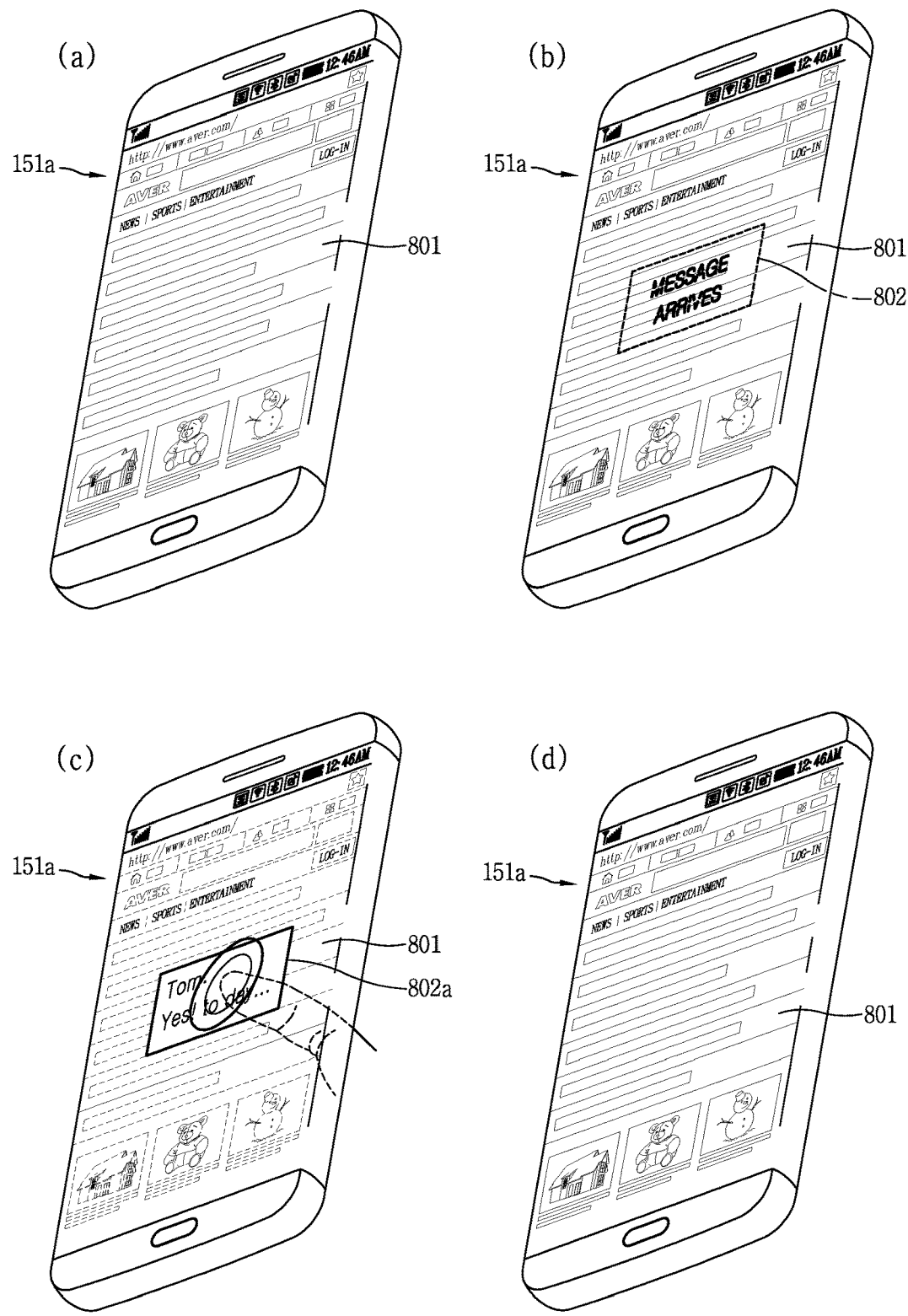

In another example, as illustrated in (a) of FIG. 8A, in a state in which screen information (or an execution screen 801) of a first application is output on the first region 151a, when an event occurs in a second application different from the first application, the controller 180 may output a first graphic object 802 indicating the occurrence of the event on the touch screen as illustrated in (b) of FIG. 8A.

In a state in which the first graphic object 802 is output, when a preset type of touch (for example, a touch applied with pressure of a preset value or higher) is applied to the second region 151b disposed on the rear surface as illustrated in (c) of FIG. 8A, the controller 180 may output a second graphic object 802a, information related to the event (or preview information related to the event) on the first region 151a. Only when the touch applied to the second region 151b is maintained, the controller 180 may output the second graphic object on the touch screen. When the preset type of touch is released, the controller 180 may terminate outputting of the information related to the event as illustrated in (b) of FIG. 8A.

In another example, when the first type of touch described above is applied to the second region 151b, as illustrated in (c) of FIG. 8A, the controller 180 may output the second graphic object 802a, the information related to the event (or preview information related to the event), on the first region 151a, and when the second type of touch described above is applied, the controller 180 may output an execution screen of the second application in which the event has occurred, on the first region 151a. In this case, the execution screen of the first application which has been first output may not be output any longer.

In addition, only when the second type of touch is applied to the second region 151b, the controller 180 may output the execution screen of the second application on the first region 151. In addition, when the second type of touch applied to the second region 151b is applied with a preset pattern or when the second type of touch is applied to the second region 151b until a preset period of time has lapsed, the controller 180 may continuously output the execution screen of the second application on the first region 151*a* even though the second type of touch is released from the second region 151*b*.

Figure 8B:
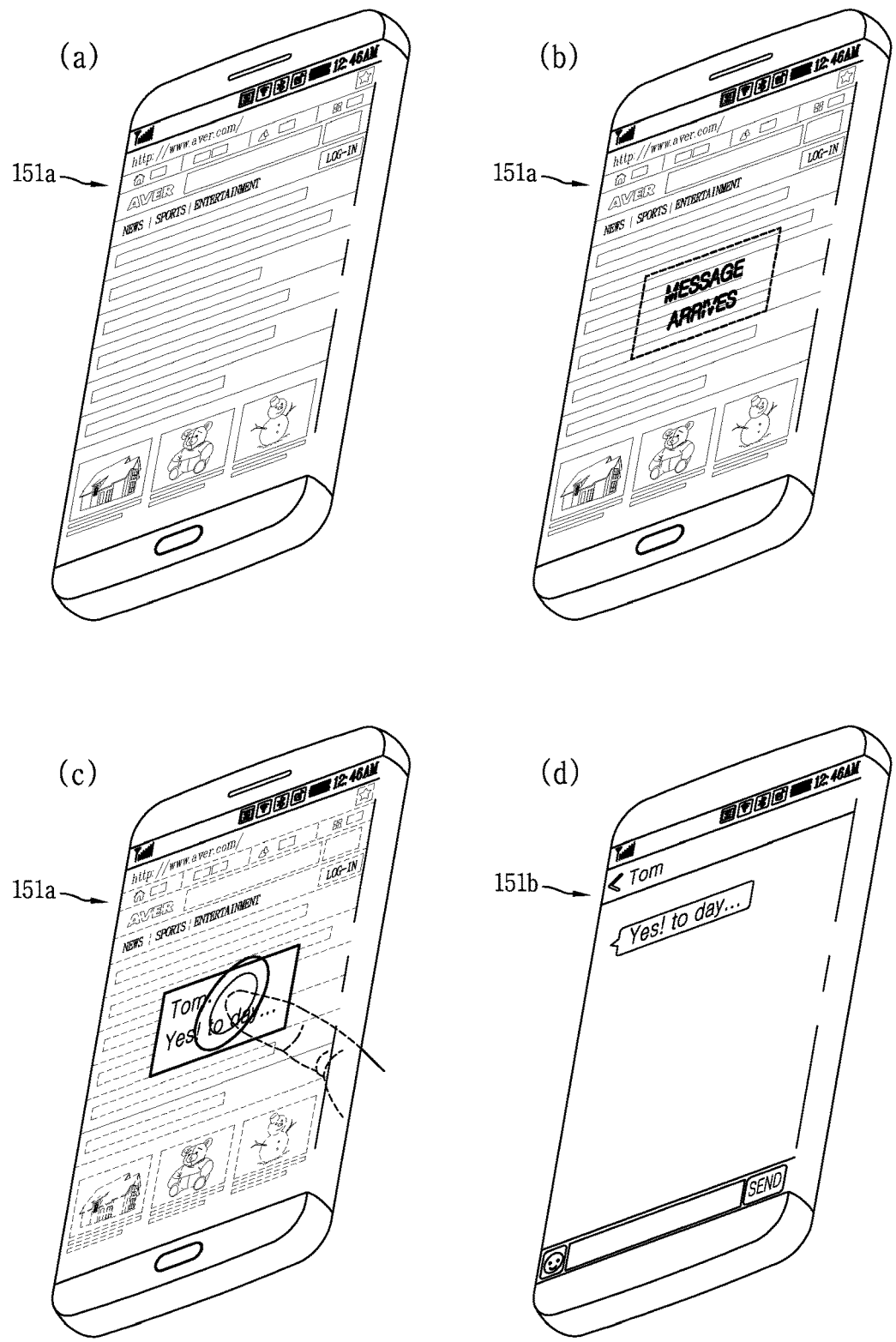

Meanwhile, the execution screen of the second application on which the event has occurred may be output on the second region 151*b* as illustrated in (d) of FIG. 8B.

As illustrated in (b) and (c) of FIG. 8B, while the graphic object indicating the occurrence of the event is being output, when a preset type of touch is applied to the second region 151*b*, the controller 180 may output the execution screen of the second application on the second region 151*b* later.

That is, the user may cause the event information to be output in the second region by utilizing the touch applied to the second region, thereby accessing the event information only by activating the second region.

Meanwhile, in the above, the case in which the preset type of touch is applied in the second region has been described, but this is merely an example, and in a case in which the preset type of touch is applied to the first region, specifically, to a graphic object indicating the occurrence of the event, the controlling described above may be performed in the same manner.

In another example, in the mobile terminal according to the present disclosure, a clipping function may be performed by utilizing the second region 151*b*. Here, the clipping function refers to a function of storing and outputting information such that information selected by the user may be provided again to the user later. For example, while the user is viewing a specific Web page, if outputting of the specific Web page is terminated, the user may want to use again information included in the specific Web page. In this case, the controller 180 may rapidly and intuitively provide the specific Web page to the user through the clipping function. The controller 180 may store information corresponding to clipping target Web page in a memory, and may generate and store a thumbnail image representing the clipping target Web page. When the thumbnail image is selected by the user later, the controller 180 may provide the clipping target Web page to the user using the information stored in the memory.

In the present disclosure, by providing clipped information on the second region 151*b*, the clipped information may be rapidly provided to the user.

This will be described in detail with reference to the accompanying drawings. FIGS. 9A, 9B, 10A, 10B, 10C, 11A, 11B, and 12 are conceptual views illustrating a method for performing a clipping function by utilizing a user input region disposed on a rear surface of a mobile terminal.

For example, as illustrated in FIG. 9A, in a state in which a specific application execution screen 1011 (for example, the execution screen may be a Web page provided in a Web browser application) is output on the first region 151*a*, when a specific type of touch (or a preset type of touch, for example, a touch applied with pressure of a preset value or greater) is applied, the controller 180 may store information corresponding to the execution screen. That is, the controller 180 may process the preset type of touch as a command for performing clipping on the execution screen. In this case, as illustrated in (b) of FIG. 9A, the controller 180 may output a thumbnail 1012 corresponding to the execution screen on the second region 151*b*.

In addition, as illustrated in (c) of FIG. 9A, thumbnails corresponding to first clipped other pieces of information (or content) may be output together on the second region 151*b*.

In detail, when the execution screen 1011 is a Web page corresponding to a specific URL address and the second type of touch described above (a general function terminal function may be performed by the first type of touch) is applied to the first region 151*a* on which the Web page is output, the controller 180 may generate a thumbnail image of the Web page and perform controlling such that the thumbnail image is output on the second region.

In addition, as illustrated in (a) of FIG. 9B, after the controlling is performed, when the second region is placed to face the user, the controller 180 may output thumbnails corresponding to the clipped pieces of information on the second region 151*b*.

Also, on the basis of the first type of touch applied to a specific thumbnail image 1012 output on the second region, the controller 180 may access the specific URL address and output the Web page again on the second region. In another example, as illustrated in (b) of FIG. 9B, in response to the first type of touch, the controller 180 may magnify and output an image 1012*a* corresponding to the thumbnail image. Also, the image 1012*a* may be preview information of the Web page.

Also, as illustrated in (b) of FIG. 9B, in response to the second type of touch applied to the thumbnail image 1012, the controller 180 may output the Web page on the first region 151*a*. A URL address of the Web page may be present as having been stored in association with the thumbnail image at the time of clipping.

Meanwhile, the controller 180 may generate different types of thumbnail images or provide information in different manners according to types of the clipped content.

Figure 10A:
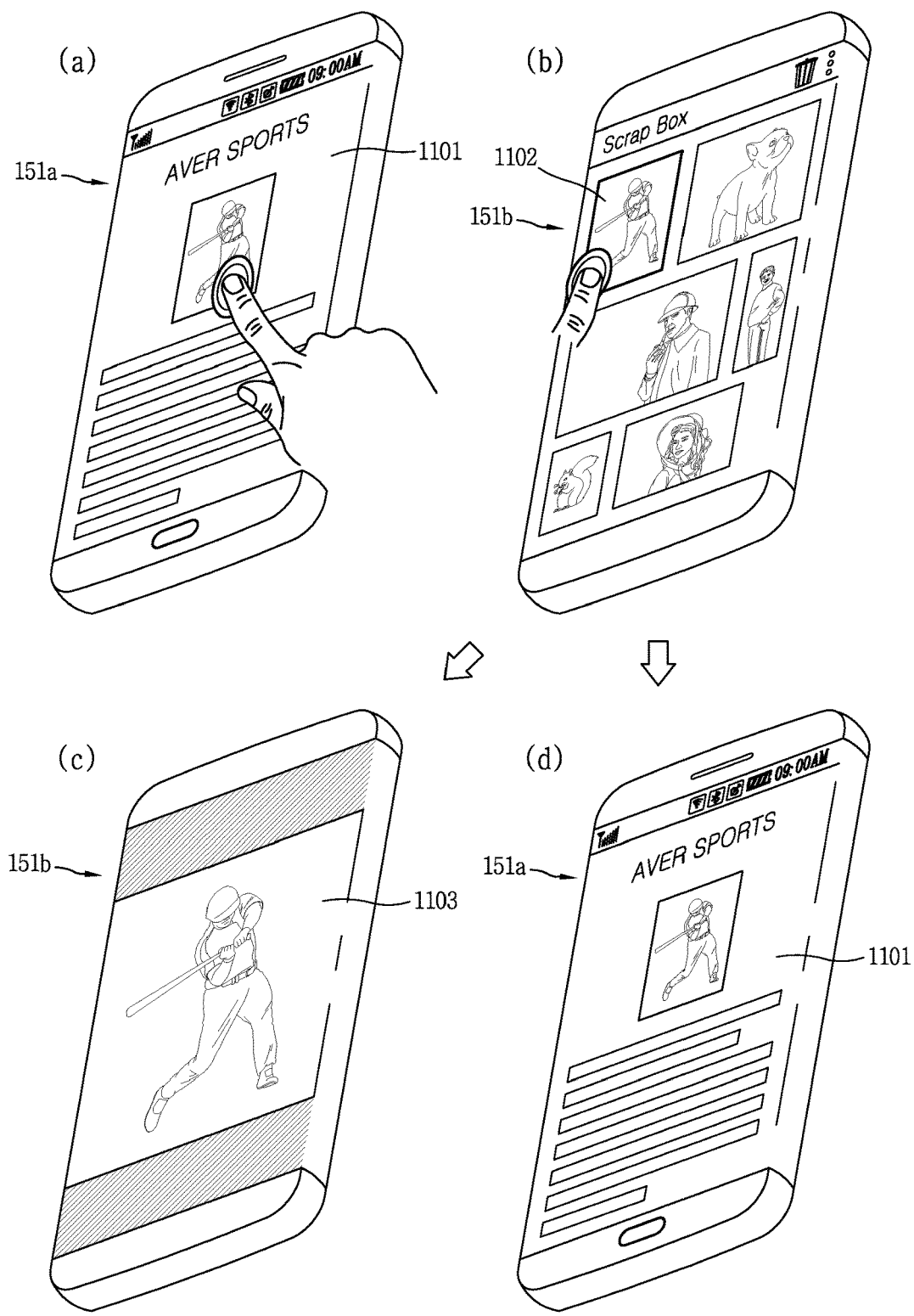

For example, when a Web page is clipped as illustrated in (a) of FIG. 10A, the controller 180 may generate a thumbnail image by utilizing an image included in the Web page or may generate a thumbnail image by capturing at least a portion of the Web page as illustrated in (b) of FIG. 10A.

Also, when a thumbnail image corresponding to a Web page is selected from the second region 151*b*, the controller 180 may output an image 1103 corresponding to the thumbnail image on any one of the first and second regions 151*a* and 151*b* or may output a Web page 1101 corresponding to the thumbnail image on any one of the first and second regions 151*a* and 151*b*, as illustrated in (c) of FIG. 10A. Meanwhile, information output on any one of the first and second regions 151*a* and 151*b* may be different.

Figure 10B:
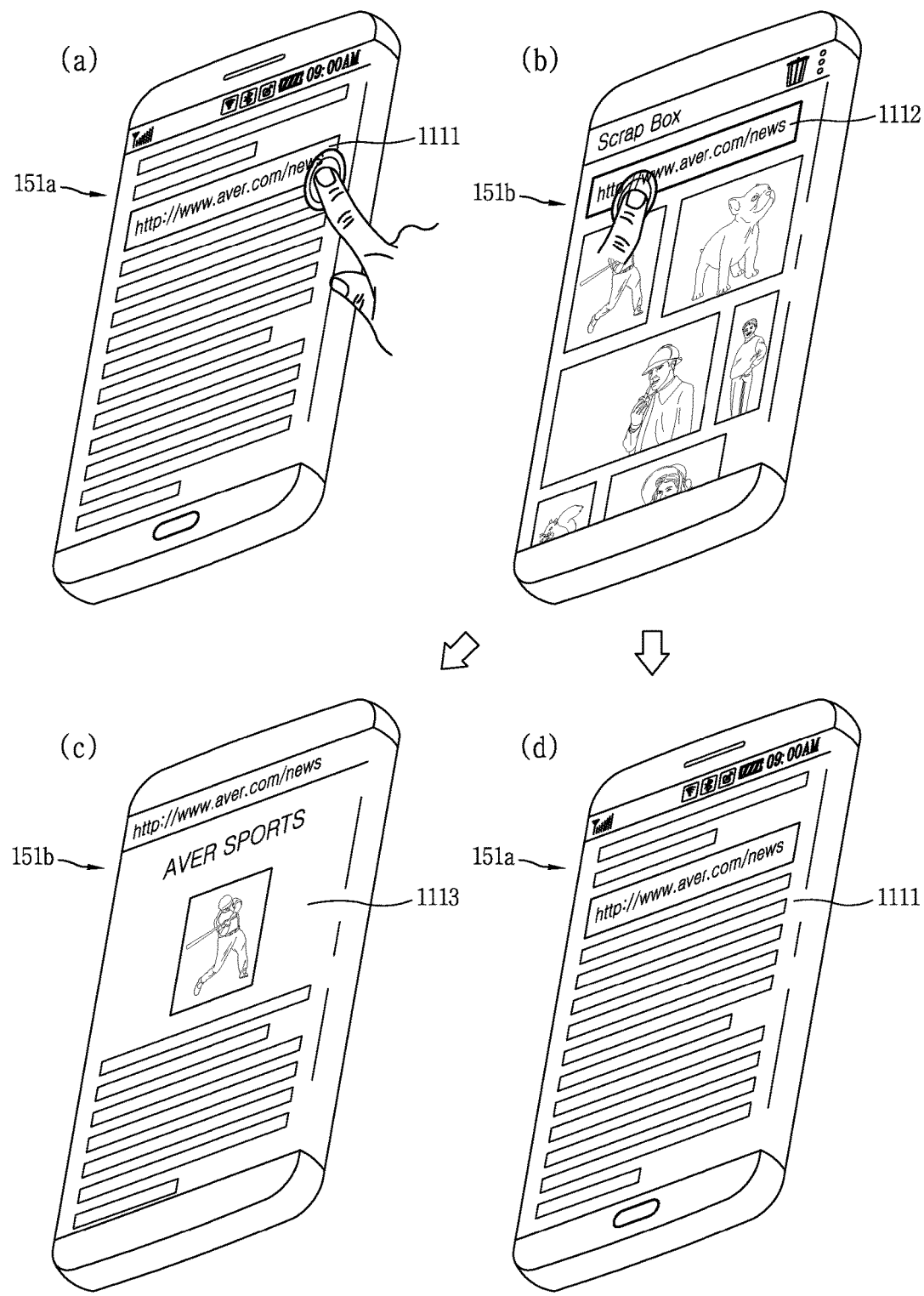

In another example, in a case in which a URL address is selected to be clipped as illustrated in (a) of FIG. 10B, the controller 180 may output a graphic object 1112 including the URL address on the second region 151*b* as illustrated in (b) of FIG. 10B.

Also, when the graphic object 1112 including the URL address is selected from the second region 151*b*, the controller 180 may output a Web page 1113 corresponding to the URL address corresponding to the graphic object 1112 on any one of the first and second regions 151*a* and 151*b* or may output a Web page 1111 from which the URL address was selected (or clipped), on any one of the first and second regions 151*a* and 151*b*, as illustrated in (c) of FIG. 10B.

Figure 10C:
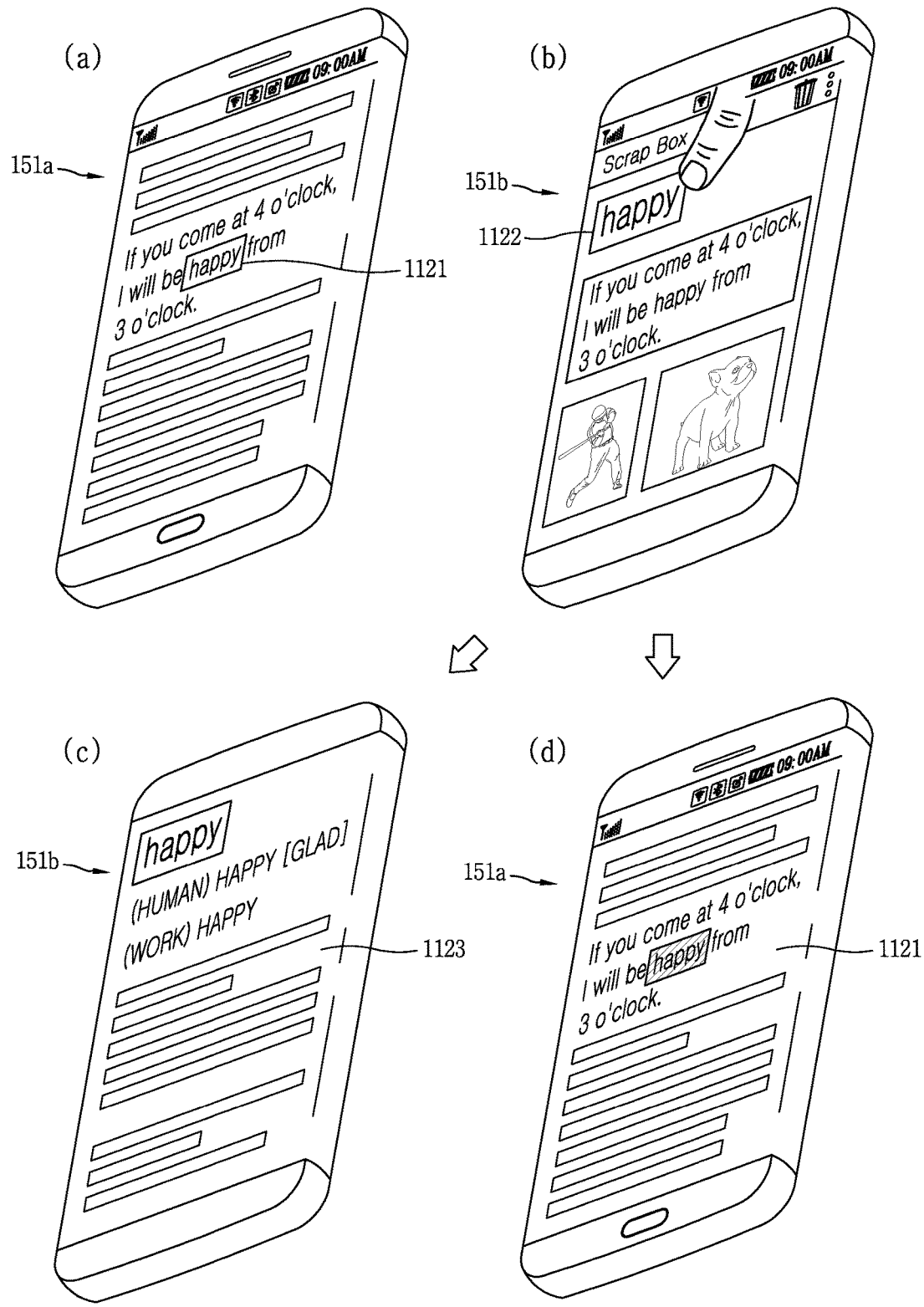

In another example, when text is selected to be clipped as illustrated in (a) of FIG. 10C, the controller 180 may output a graphic object 1122 including the text on the second region 151*b* as illustrated in (b) of FIG. 10C.

Also, when the graphic object 1122 including the text is selected from the second region 151*b*, the controller 180 may output information (for example, a Web search result of searching using the text or a previous search result) related to the clipped text 1123 on any one of the first and second regions 151*a* and 151*b* or may output the text-selected (or clipped) Web page 1121 on any one of the first and second regions 151a and 151b, as illustrated in (c) and (d) of FIG. 10C.

In this manner, the controller 180 may provide information according to the clipped information (for example, a Web page when a URL address is clipped, or a search result corresponding to text when the text is searched) according to what the clipped information is.

Figure 11A:
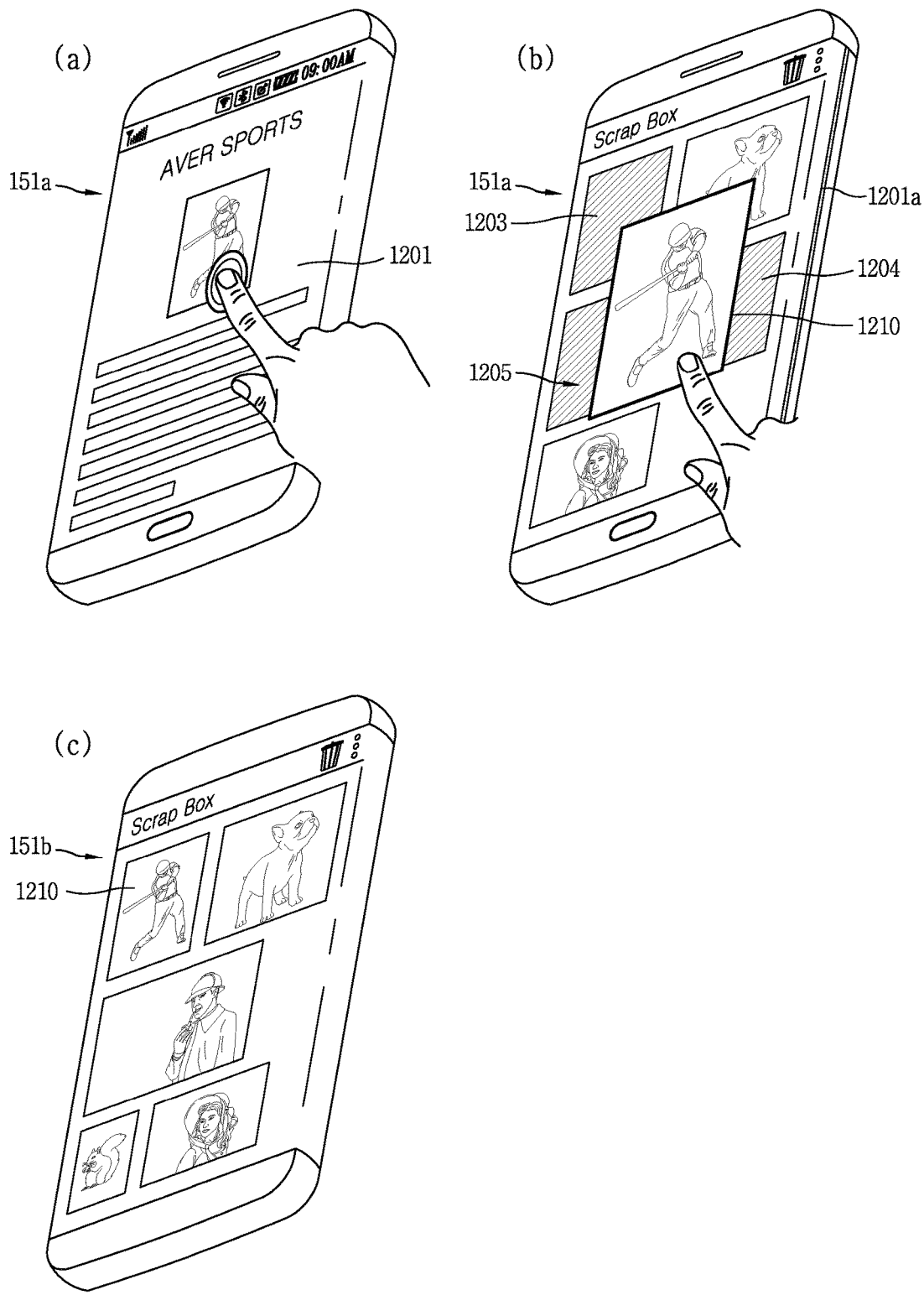

Meanwhile, in the mobile terminal according to the present disclosure, when a touch corresponding to a clipping command regarding specific information 1201 is applied to the first region 151a as illustrated in (a) of FIG. 11A, the controller 180 may output a guide image for setting a disposition position of a thumbnail image 1210 corresponding to the specific information in the second region 151b as illustrated in (b) of FIG. 11A. As illustrated, the controller 180 may output images 1203, 1204, and 1205 to regions in which the guide images can be disposed in the second region 151b. On the basis of a touch direction of a drag touch continued from the touch for clipping, the controller 180 may determine a disposition position of the thumbnail image in the second region 151b. For example, when a touch for clipping is applied, the controller 180 may output an indicator 1201a corresponding to the clipping target information in the third region 151c, and output guide images 1203, 1204, and 1205 on the first region 151a. Also, as illustrated in (c) of FIG. 11A, the controller 180 may place the thumbnail image 1210 in a position corresponding to the guide images to which the thumbnail image 1210 has been moved.

Meanwhile, after clipping is completed, as illustrated in (a) and (b) of FIG. 11B, when a touch is applied to the second region in a state in which the first region 151a is placed to face the user, a thumbnail image 1222 disposed in the touch-applied region may be output on the first region 151a. As illustrated in (c) of FIG. 11B, the controller 180 may magnify and output the thumbnail image 1223.

In addition, the controller 180 may perform controlling such that an application corresponding to screen information 1221 output on the first region 151a uses information corresponding to the thumbnail image 1222. For example, an application corresponding to screen information 1221 output on the first region 151a is a messenger function application, the controller 180 may transmit information corresponding to the thumbnail image 1222 to a counterpart terminal through the messenger function application. That is, on the basis of a touch applied to the second region 151b, the controller 180 may process the information output on the first region 151a and the information corresponding to the thumbnail image disposed in the touch-applied region in the second region 151b in an associating manner.

In addition, although not shown, in the mobile terminal according to an embodiment of the present disclosure, when a touch for clipping is applied, a graphic user interface (GUI) allowing a clipping target region to be set in the screen information output on the first region 151a may be provided. Thus, the user may select only a portion to be clipped from the screen information to clip it. The clipping target region may be set by a touch input.

Figure 12:
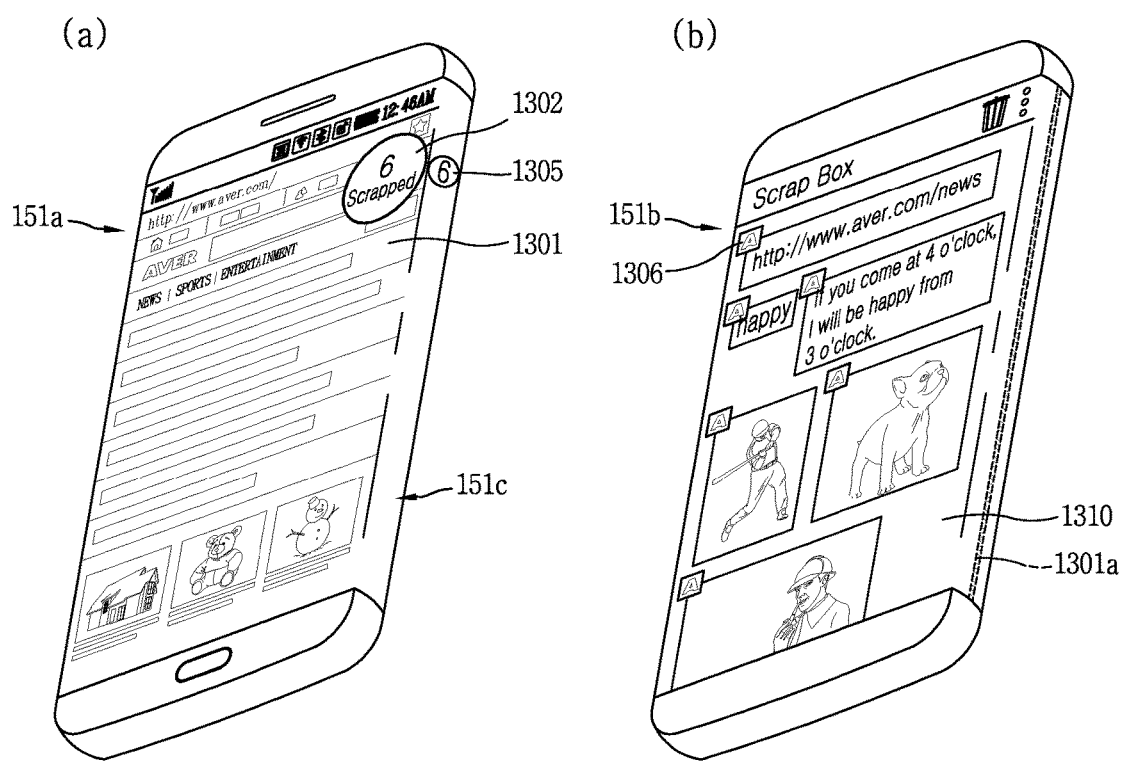

Meanwhile, in the mobile terminal according to the present disclosure, in a case in which clipped information is present, indicators 1302 and 1305 indicating the presence of the clipped information may be output on at least one of the first and third regions 151a and 151c as illustrated in (a) of FIG. 12. The indicators 1302 and 1305 may also be output when a touch is applied to the second region 151b.

In addition, the clipped information may be output together with an indicator 1306 indicating a source of a clipped application on the second region as illustrated in (b) of FIG. 12.

As described above, in the mobile terminal and the control method thereof according to the present disclosure, information output on the front touch screen may be used through the rear touch screen according to a type of a touch input applied to the touch screen disposed on the front surface, and in addition, an additional function related to the information output on the front touch screen may be performed. Thus, when the user does not want to use the information output on the front touch screen on the front surface any longer or when the user wants to use the information output on the front touch screen later, the user may move the corresponding in formation to the rear touch screen and utilize the same later. Thus, the user may utilize the rear screen, like a function of a notebook.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal comprising:
a terminal body having a front side, a lateral side, and a rear side;
a touch screen located at the front side and extending from the front side along the lateral side and further extended to be located at the rear side; and
a controller configured to:

cause the touch screen to display a graphic object on a first region of the touch screen, wherein the first region is located at the front side of the touch screen;

perform a first function when a first type of touch is received at the graphic object, wherein the first function is associated with the graphic object;

perform a second function when a second type of touch is received at the graphic object, wherein the second function displays information related to the graphic object on a second region of the touch screen, wherein the second region is located at the rear side of the touch screen;

generate a thumbnail image of the graphic object and cause the touch screen to display the thumbnail image and a guide image on the first region in response to the second type of touch received via the first region, wherein the guide image is for setting a disposition position of the thumbnail image to be displayed on the second region;

designate the disposition position of the thumbnail image according to a position where the thumbnail image is moved on the guide image; and cause the touch screen to display the thumbnail image at the designated disposition position on the second region.

2. The mobile terminal of claim 1, wherein the controller is further configured to:

determine whether the touch screen is in a first state in which the first region faces a user or in a second state in which the second region faces the user; and cause the touch screen to display the information related to the graphic object on the second region when the touch screen is in the second state.

3. The mobile terminal of claim 2, wherein:

the graphic object comprises an icon of a specific application; and the controller is further configured to deactivate a notification information output function regarding an event that occurs in the specific application in response to the second type of touch received at the graphic object.

4. The mobile terminal of claim 3, wherein the controller is further configured to activate the deactivated notification information output function in response to the second type of touch received at the information related to the graphic object displayed on the second region.

5. The mobile terminal of claim 1, wherein:

the graphic object comprises a web page corresponding to a specific Uniform Resource Locator (URL) address; and the controller is further configured to generate a thumbnail image of the web page and cause the touch screen to display the thumbnail image corresponding to the web page on the second region in response to the second type of touch received via the first region on which the web page is displayed.

6. The mobile terminal of claim 5, wherein:

the controller is further configured to cause the touch screen to further display a guide image on the first region in response to the second type of touch received via the first region on which the web page is displayed, wherein the guide image is for setting a disposition position of the thumbnail image corresponding to the web page; and the disposition position of the thumbnail image is specified in the second region based on a touch direction of a drag touch continued from the second type of touch applied to the first region on which the web page is displayed.

7. The mobile terminal of claim 6, wherein the controller is further configured to:

cause the touch screen to display the thumbnail image corresponding to the web page at the disposition position determined based on the drag touch in the second region when the second region is positioned to face the user after the information related to the graphic object is displayed on the second region; and access the specific URL address to cause the touch screen to display the web page again on the second region when the first type of touch is received at the thumbnail image displayed on the second region.

8. The mobile terminal of claim 7, wherein the controller is further configured to cause the touch screen to display the thumbnail image corresponding to the web page on the first region and process a function corresponding to screen information displayed on the first region and at least a portion of information of a web page corresponding to the thumbnail image corresponding to the web page in an associated manner when a preset type of touch is received at a region in which the thumbnail image corresponding to the web page is located on the second region in a state in which the first region is positioned to face the user.

9. The mobile terminal of claim 7, wherein the controller is further configured to cause the touch screen to display the web page corresponding to the specific URL address on the first region when the second type of touch is received at the thumbnail image corresponding to the web page displayed on the second region.

10. The mobile terminal of claim 1, wherein the guide image comprises a plurality of thumbnail images.

11. The mobile terminal of claim 10, wherein the plurality of thumbnail images are displayed on the second region along with the thumbnail image displayed at the designated disposition position on the second region.

* * * * *